(12) United States Patent
Moore et al.

(10) Patent No.: US 7,373,303 B2
(45) Date of Patent: May 13, 2008

(54) METHODS AND SYSTEMS FOR ESTIMATING BUILDING RECONSTRUCTION COSTS

(75) Inventors: George C. Moore, Port Chester, NY (US); Todd Rissel, New Canaan, CT (US)

(73) Assignee: E2Value, Inc., Norwalk, CT (US)

( * ) Notice: Subject to any disclaimer, the term of this patent is extended or adjusted under 35 U.S.C. 154(b) by 1063 days.

(21) Appl. No.: 10/013,428

(22) Filed: Dec. 10, 2001

(65) Prior Publication Data

US 2003/0115163 A1 Jun. 19, 2003

(51) Int. Cl.
*G06Q 99/00* (2006.01)
(52) U.S. Cl. ......................................................... 705/1
(58) Field of Classification Search ...................... 705/1
See application file for complete search history.

(56) References Cited

U.S. PATENT DOCUMENTS

| | | | | |
|---|---|---|---|---|
| 5,189,606 A | 2/1993 | Burns et al. | ................. | 364/401 |
| 5,249,120 A | 9/1993 | Foley | ......................... | 364/401 |
| 5,317,503 A | 5/1994 | Inoue | ......................... | 364/400 |
| 5,361,201 A * | 11/1994 | Jost et al. | ...................... | 705/35 |
| 5,414,621 A | 5/1995 | Hough | ........................ | 364/401 |
| 5,432,904 A | 7/1995 | Wong | ......................... | 395/161 |
| 5,546,564 A | 8/1996 | Horie | ......................... | 395/500 |
| 5,680,305 A | 10/1997 | Apgar, IV | ................ | 364/401 R |
| 5,761,674 A | 6/1998 | Ito | ............................. | 707/104 |
| 5,857,174 A | 1/1999 | Dugan | ............................ | 705/1 |
| 5,893,082 A | 4/1999 | McCormick | ................ | 705/400 |
| 5,918,219 A | 6/1999 | Isherwood | .................... | 705/37 |
| 5,920,849 A | 7/1999 | Broughton et al. | ......... | 705/400 |
| 6,014,503 A | 1/2000 | Nagata et al. | ......... | 395/500.01 |
| 6,115,694 A | 9/2000 | Cheetham et al. | ............ | 705/10 |
| 6,141,648 A | 10/2000 | Bonissone et al. | ............ | 705/10 |
| 6,219,930 B1 | 4/2001 | Reid | ............................ | 33/562 |
| 2002/0010601 A1 * | 1/2002 | Taylor | .......................... | 705/4 |

FOREIGN PATENT DOCUMENTS

WO    WO 02/01423 A1 *    1/2002

OTHER PUBLICATIONS

Anonymous, "Automation Update: Expanded Building Replacement Cost Software from Marshall & Swift," National Underwriter Property & Casualty—Risk & Benefits Management, Nov. 4, 1991, p. 35.*
Means, R. S. "RSMeans.com" www.rsmeans.com, May 1, 2001, 22 pages.

* cited by examiner

*Primary Examiner*—John W. Hayes
*Assistant Examiner*—Nathan H. Erb
(74) *Attorney, Agent, or Firm*—Day Pitney LLP

(57) ABSTRACT

Systems and methods are provided for estimating a reconstruction cost for a building as well as for a designated area within a building. Reconstruction pricing data based on builder-supplied full reconstruction-cost data are stored in a database from which the data is accessed by geographic location, building-category and building-area type. The accessed data are used to produce the reconstruction cost estimate.

8 Claims, 19 Drawing Sheets

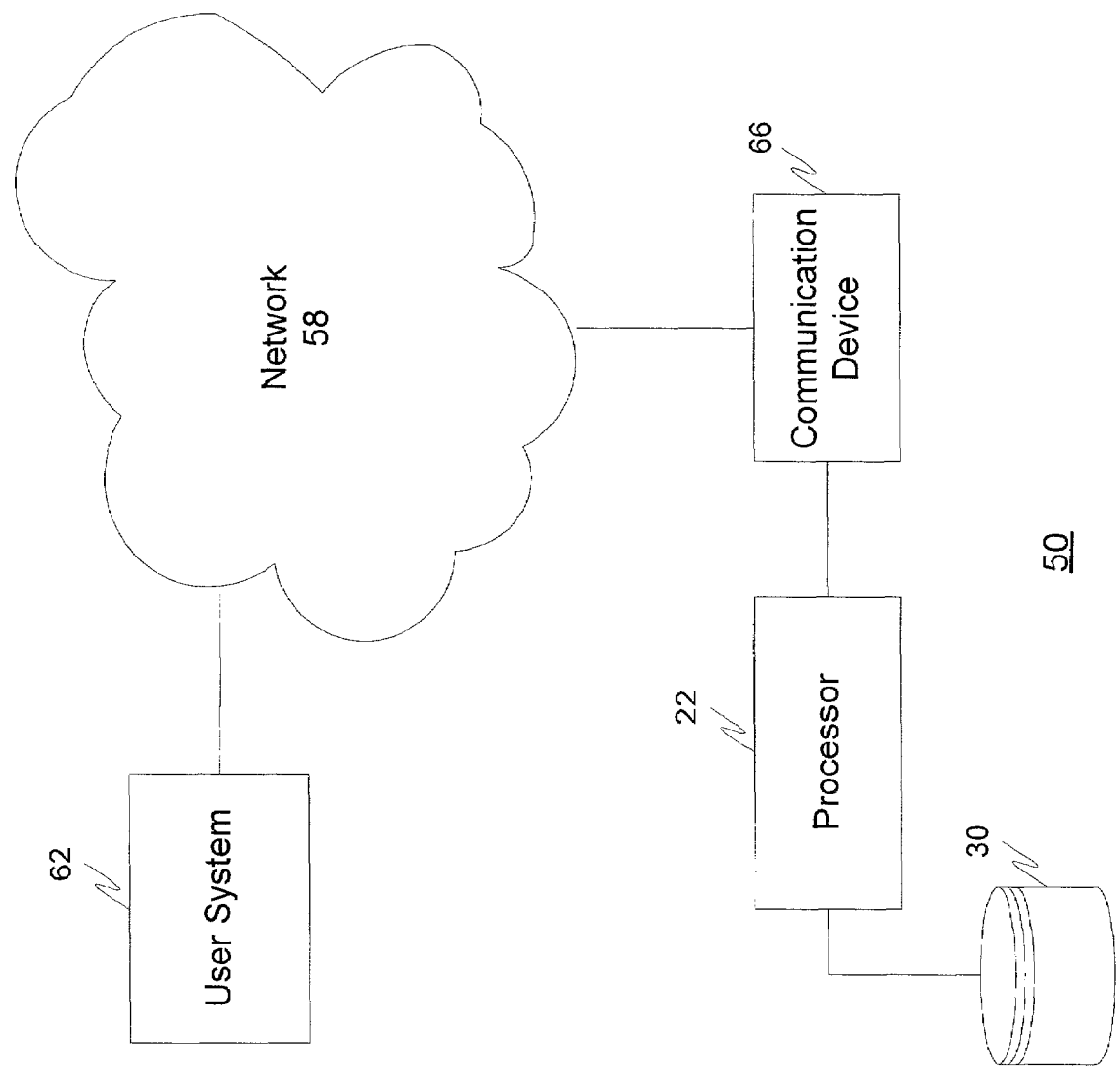

TF = Type Factor

PI = Price Index

API = Adjusted Price Index $AF_i$ = Area Factor for Area i

AAM = Adjusted Age Multiplier $AAV_i$ = Adjusted Area Value for Area i $AAV_{i=L}$ = Adjusted Area Value for Living Area $Sz_i$ = Size of Area i $RC_T$ = Total Reconstruction Cost Sz_L = Size of Living Area
SV = Size Value
CQ = Construction Quality
AS_T = Achitectural Style
QP = Quality of Premises
PhSp = Physical Shape
CM = Construction Model
CT_P = Construction Type

FIGURE 5

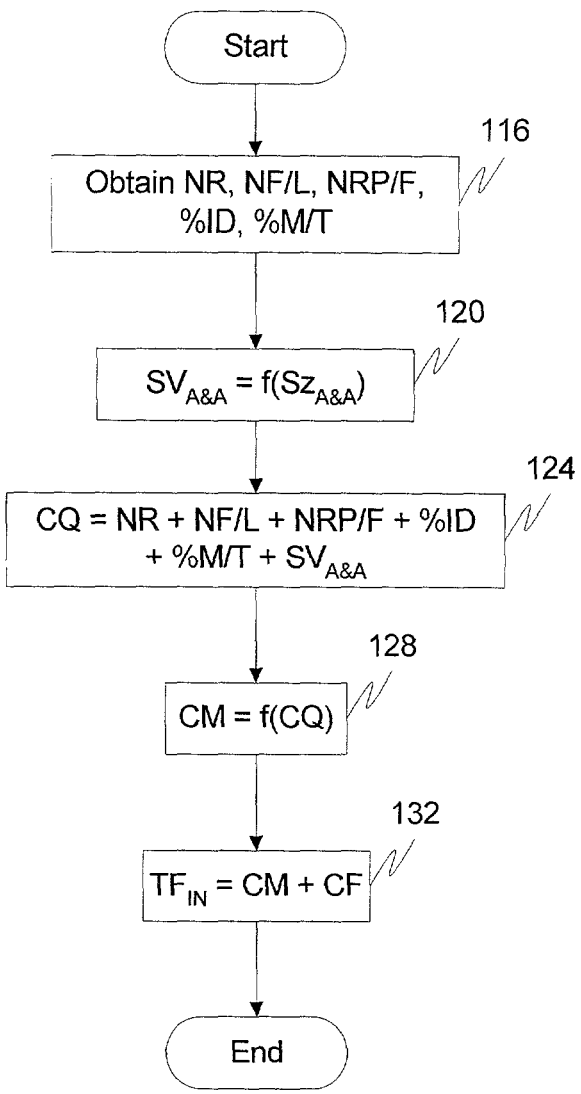

NR = Value for Number of Rooms
NF/L = Value for Number of Floors/Levels
NRP/F = Value for Number of Rooms with Paneling/Wall Coverings
%ID = Value for Percentage of Unit Touched by Interior Decorator/Designer
%M/T = Value for Percentage of Unit with Moldings/Trim
SzA&A = Value for Size of Living Area in Unit
CQ = Construction Quality
CM = Construction Model
CF = Construction Model Factor LAB = Living Area Base
$AS_T$ = Style Factor
SUM SpF = Sum of Special Features
RA = Report Adjustment
LAB1 = Preliminary Value of Living Area Base for Exterior Appraisal and Full Appraisal
SlopeM = Slope Multiplier
DescLoc = Description of Locale

Chi = Number of Chimneys
$QualF_{Chi}$ = Quality Factor for Chimneys
ChiVal = Chimney Value FlCov = Value for Floor Coverings
PriFlCov = Value for Primary Floor Coverings
SecFl Cov = Value for Secondary Floor Coverings
IntWConst = Value for Interior Wall Construction
PriIWConst = Value for Primary Interior Wall Construction
SecIW Const = Value for Secondary Interior Wall Construction
WICov = Final Wall Covering Value AChiVal = Adjusted Chimney Value
AFireVal = Adjusted Fireplace Value
HVACVal = Value for HVAC System MiscVal = Value of Miscellaneous Items
UnIltmi = Value of Unique Item i
TotUnIltm = Sum of Unique Items 1 thru n
ATotUnIltm = Adjusted Sum of Unique Items

FIGURE 10

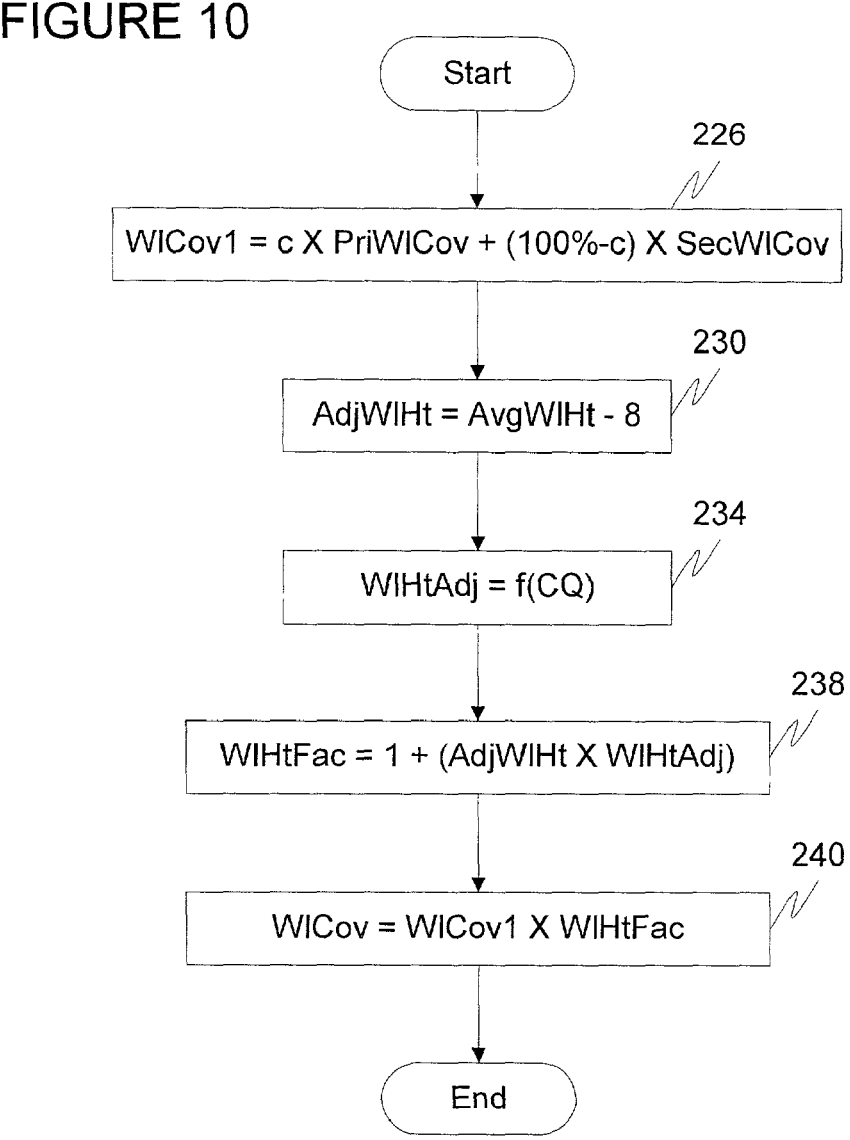

WlCov1 = Intermediate Value for Wall Coverings
PriWlCov = Value for Primary Wall Coverings
SecWlCov = Value for Secondary Wall Coverings
AvgWlHt = Average Height of Interior Walls
AdjWlHt = Adjusted Average Wall Height Value
WlHtAdj = Adjustment Value Based on Construction Quality
WlHtFac = Adjustment Factor Based on Average Wall Height and Construction Quality
WlCov = Wall Covering Value

Fire = Number of Fireplaces
$QualF_{Fire}$ = Quality Factor for Fireplaces
FireVal = Fireplace Value $LAB_{INT}$ = Intermediate Value of Living Area Base
UniTp = Type of Unit
LocM = Locale Multiplier
CovExt = Coverage Extent Factor
QC = Quality of Construction
$RA_{BASE}$ = Base Value for Report Adjustment
$SpF_{A\&A}$ = Special Features for A&A Appraisal

METHODS AND SYSTEMS FOR ESTIMATING BUILDING RECONSTRUCTION COSTS

FIELD OF THE INVENTION

The present invention concerns methods and systems for estimating building reconstruction costs.

BACKGROUND OF THE INVENTION

Building owners often prefer to minimize their risks of loss due to fire and other hazards by obtaining insurance to indemnify them against the cost of reconstructing the insured property. From the perspective of the insurer, the ability to accurately estimate building reconstruction costs is essential for setting an appropriate premium for such a policy.

Unfortunately, existing methods for estimating reconstruction costs are complex and often inaccurate. The traditional method for estimating reconstruction cost attempts to calculate the total cost of labor and materials necessary to reconstruct an existing property, and then adds an assumed contractor profit margin. But to be accurate this method requires a large amount of information and requires that a substantial number of assumptions be made which are not likely to be especially accurate, particularly as the prices for labor, materials and contracting services vary with market conditions.

Attempts have been made to simplify the methodology for estimating construction costs. U.S. Pat. No. 5,546,564 to Horie proposes a construction cost estimating system in which a database of completed construction projects is maintained with cost data for each project and other data for sorting the projects for relevance to a particular proposed new project. Essentially, Horie attempts to select a subset of the most relevant projects (a "small mother group") and then derive an overall cost per unit area of the new project by weighting the costs per unit area of the projects in the small mother group according to their presumed relevance.

This technique, however, is subject to substantial inaccuracy due to the effects of its simplifying assumptions. For example, it is not valid to assume that a single cost per unit area may be estimated accurately for a given construction project, since each project usually involves the construction of a number of different types of structures and areas with widely different per-unit-area costs of construction. Moreover, there are a great many cost influences that will vary from project to project, thus making it impractical to assess the relevance of any given project to another.

The present invention successfully addresses the shortcomings of existing methods and proposals to provide highly accurate and reliable systems and methodologies for estimating the reconstruction cost of an existing building.

SUMMARY OF THE INVENTION

As used herein the following terms shall have the meanings indicated:

The term "building" shall mean either a single structure, a number of connected structures or a number of related structures, as the context may indicate, and includes both entire structures and units (including but not limited to cooperative and condominium units) within entire structures.

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested.

The terms "coupled", "coupled to" and "coupled with" as used herein each means a relationship between or among two or more devices, apparatus, files, programs, media, components, networks, systems, subsystems and/or means, constituting any one or more of (a) a connection whether direct or through one or more other devices, apparatus, files, programs, media, components, networks, systems, subsystems or means, (b) a communications relationship whether direct or through one or more other devices, apparatus, files, programs, media, components, networks, systems, subsystems, or means, or (c) a functional relationship in which the operation of any one or more thereof depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means one or more processing devices, apparatus, programs, circuits, systems and/or subsystems, whether implemented in hardware, software or both.

The term "database" as used herein means a single database or multiple databases as implemented.

The term "network" as used herein includes both networks and inter-networks of all kinds, including the Internet, and is not limited to any particular network or inter-network.

In accordance with an aspect of the present invention, a method is provided for estimating a reconstruction cost for a designated area within a building. The method comprises providing access to a database of reconstruction-pricing data comprising (a) a plurality of price-index data indexed by corresponding geographic location and representing reconstruction-pricing data for a plurality of different building types and a plurality of different building-area types within a building, (b) comparative building-category data representing relative pricing levels for reconstructing each of a plurality of different building categories, and (c) comparative building-area data representing relative pricing levels for reconstructing each of the plurality of different building-area types within a building; providing geographic-location data of a predetermined building; providing building category-defining data for the predetermined building; providing building area-type data for a designated area within the building, the building area-type data being selected from the plurality of different building-area types within a building; obtaining relevant price-index data from the database for the geographic location of the predetermined building based on the geographic-location data; obtaining relevant comparative building-category data from the database for the predetermined building based on the building category-defining data for the predetermined building; obtaining relevant comparative building-area data from the database based on the building-area type data for the designated area; and producing a reconstruction-cost estimate for the designated area within the building based on the relevant price-index data, the relevant comparative building-category data and the relevant comparative building-area data.

In accordance with another aspect of the present invention, a system is provided for estimating a reconstruction cost for a designated area within a building. The system comprises means for providing access to a database of reconstruction-pricing data comprising (a) a plurality of price-index data indexed by corresponding geographic location and representing reconstruction-pricing data for a plurality of different building types and a plurality of different building-area types within a building, (b) comparative building-category data representing relative pricing levels for reconstructing each of a plurality of different building categories, and (c) comparative building-area data representing relative pricing levels for reconstructing each of the plurality of different building-area types within a building; means for providing geographic-location data of a predetermined building; means for providing building category-defining data for the predetermined building; means for providing building area-type data for a designated area within the building, the building area-type data being selected from the plurality of different building-area types within a building; means for obtaining relevant price-index data from the database for the geographic location of the predetermined building based on the geographic-location data; means for obtaining relevant comparative building-category data from the database for the predetermined building based on the building category-defining data for the predetermined building; means for obtaining relevant comparative building-area data from the database based on the building-area type data for the designated area; and means for producing a reconstruction-cost estimate for the designated area within the building based on the relevant price-index data, the relevant comparative building-category data and the relevant comparative building-area data.

In accordance with a further aspect of the present invention, a method is provided for estimating a reconstruction cost for a predetermined building. The method comprises providing access to a database of reconstruction cost data accessible by geographic location and/or type of area within a building; providing geographic location data indicating a geographic location of a predetermined building; providing first building area-type data indicating a type of a first area within the building and second building area-type data indicating a type of a second area within the building, the first and second building area-type data being selected from a plurality of different predetermined building-area types; obtaining first reconstruction cost data for the first area within the building from the database, the first reconstruction cost data corresponding to the geographic-location data and the first building area-type data; obtaining second reconstruction-cost data for the second area within the building from the database, the second reconstruction-cost data corresponding to the geographic-location data and the second building area-type data; and producing a reconstruction-cost estimate for the building based on the first and second reconstruction-cost data.

In accordance with still further aspect of the present invention, a system is provided for estimating a reconstruction cost for a predetermined building. The system comprises means for providing access to a database of reconstruction-cost data accessible by geographic location and/or type of area within a building; means for providing geographic-location data indicating a geographic location of a predetermined building; means for providing first building area-type data indicating a type of a first area within the building and second building area-type data indicating a type of a second area within the building, the first and second building area-type data being selected from a plurality of different predetermined building-area types; means for obtaining first reconstruction cost data for the first area within the building from the database, the first reconstruction-cost data corresponding to the geographic-location data and the first building area-type data; means for obtaining second reconstruction-cost data for the second area within the building from the database, the second reconstruction-cost data corresponding to the geographic-location data and the second building area-type data; and means for producing a reconstruction-cost estimate for the building based on the first and second reconstruction-cost data.

In accordance with yet another aspect of the present invention, a method is provided for estimating a reconstruction cost for a predetermined area within a building. The method comprises providing access to a database of full reconstruction-pricing data based on builder-supplied full reconstruction-price data, the full reconstruction-pricing data being expressed as a plurality of per unit area pricing data accessible according to geographic reconstruction location and/or type of building area selected from a predetermined plurality of building-area types within a building; providing geographic-location data indicating a geographic location of a predetermined building; providing building area-type data for a designated area within the building, the building area-type data being selected from the predetermined plurality of building-area types; obtaining corresponding per-unit-area pricing data for the designated area from the database, the corresponding per-unit-area pricing data corresponding to the geographic-location data and the building area-type data; and producing a reconstruction-cost estimate for the designated area based on the corresponding per-unit-area pricing data and a size value for the designated area.

In accordance with still another aspect of the present invention, a system is provided for estimating a reconstruction cost for a predetermined area within a building. The system comprises means for providing access to a database of full reconstruction-pricing data based on builder-supplied full reconstruction-price data, the full reconstruction-pricing data being expressed as a plurality of per-unit-area pricing data accessible according to geographic reconstruction location and type of building area selected from a predetermined plurality of building-area types within a building; means for providing geographic-location data indicating a geographic location of a predetermined building; means for providing building area-type data for a designated area within the building, the building area-type data selected from the predetermined plurality of building area types; means for obtaining corresponding per-unit-area pricing data for the designated area from the database, the corresponding per-unit-area pricing data corresponding to the geographic-location data and the building area-type data; and means for producing a reconstruction-cost estimate for the designated area based on the corresponding per-unit-area pricing data and a size value for the designated area.

BRIEF DESCRIPTION OF THE DRAWINGS

FIG. 2 is a block diagram of a networked system in accordance with certain embodiments of the present invention;

FIG. 5 is a flow diagram of a type factor routine for an additions and alterations appraisal within the method of FIGS. 3A and 3B;

FIG. 10 is a flow diagram of a wall coverings routine within the routine of FIGS. 9A, 9B and 9C;

DETAILED DESCRIPTION OF CERTAIN ADVANTAGEOUS EMBODIMENTS

Figure 1A:
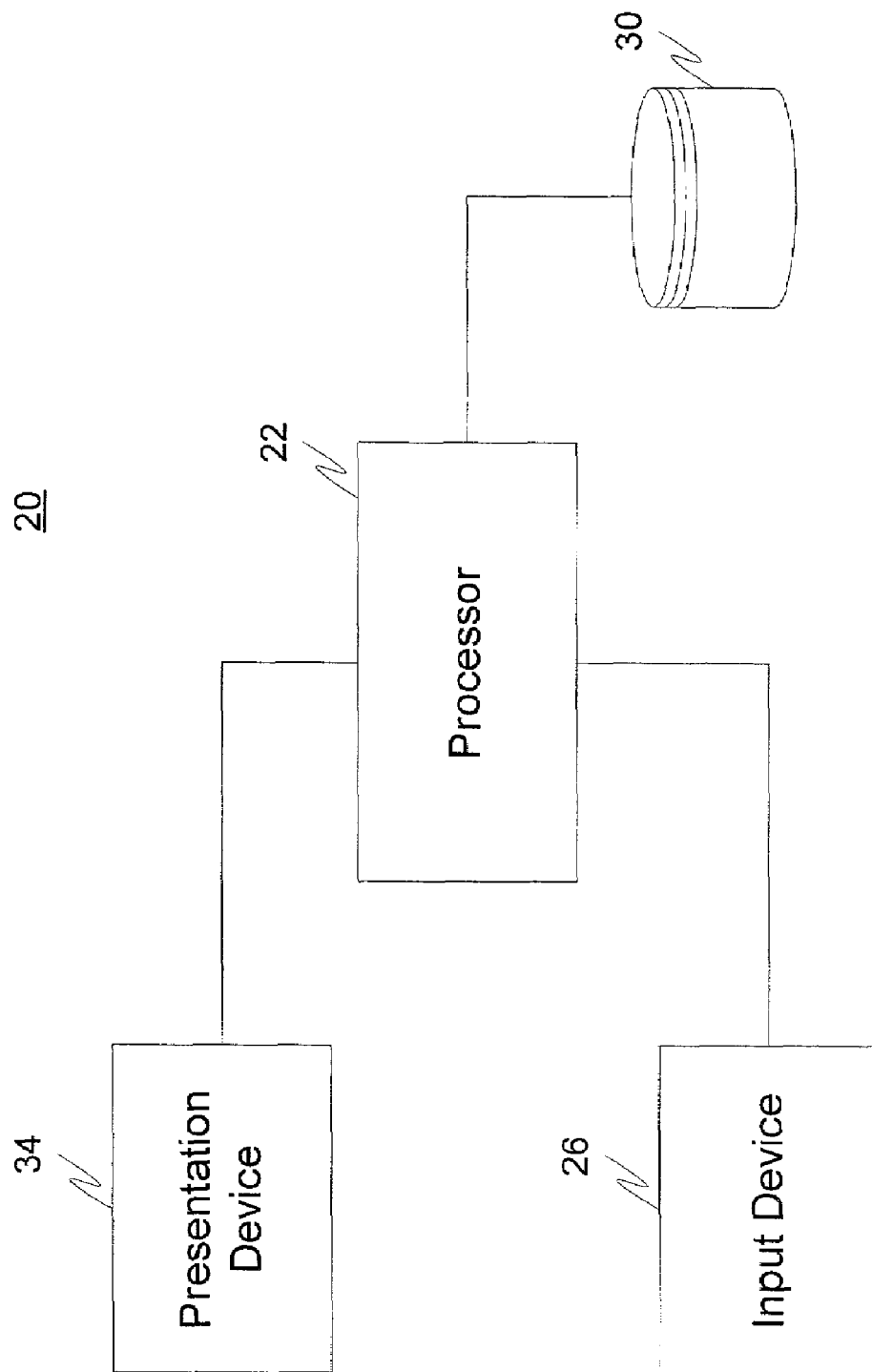
FIG. 1A is a block diagram of a stand-alone system in accordance with certain embodiments of the present invention.

FIG. 1A illustrates certain embodiments of the invention which are implemented in a stand-alone system 20 having a processor 22 programmed or arranged to produce reconstruction cost estimates for existing buildings based on information input by a user using an input device 26 coupled with the processor 22 and reconstruction cost data obtained by the processor 22 from a database 30. The processor 22 communicates the produced reconstruction cost estimate to a presentation device 34 for presentation to a user.

The operation of the embodiments of FIG. 1A will now be illustrated with reference to FIG. 1B which provides a diagram of a residential building 38 having a living area 40, an attached garage 44 and enclosed porch 48, each being treated as a separate building-area type for purposes of producing the reconstruction cost estimate for the building 38 using the embodiment of FIG. 1A. The database 30 stores reconstruction-cost data for residential buildings which is accessible by geographic location and building-area type. In other embodiments, the database 30 is replaced by or supplemented with one or more databases including reconstruction-cost data for office buildings, industrial buildings and/or institutional buildings, to enable the production of reconstruction-cost estimates for buildings of those types.

Figure 1B:
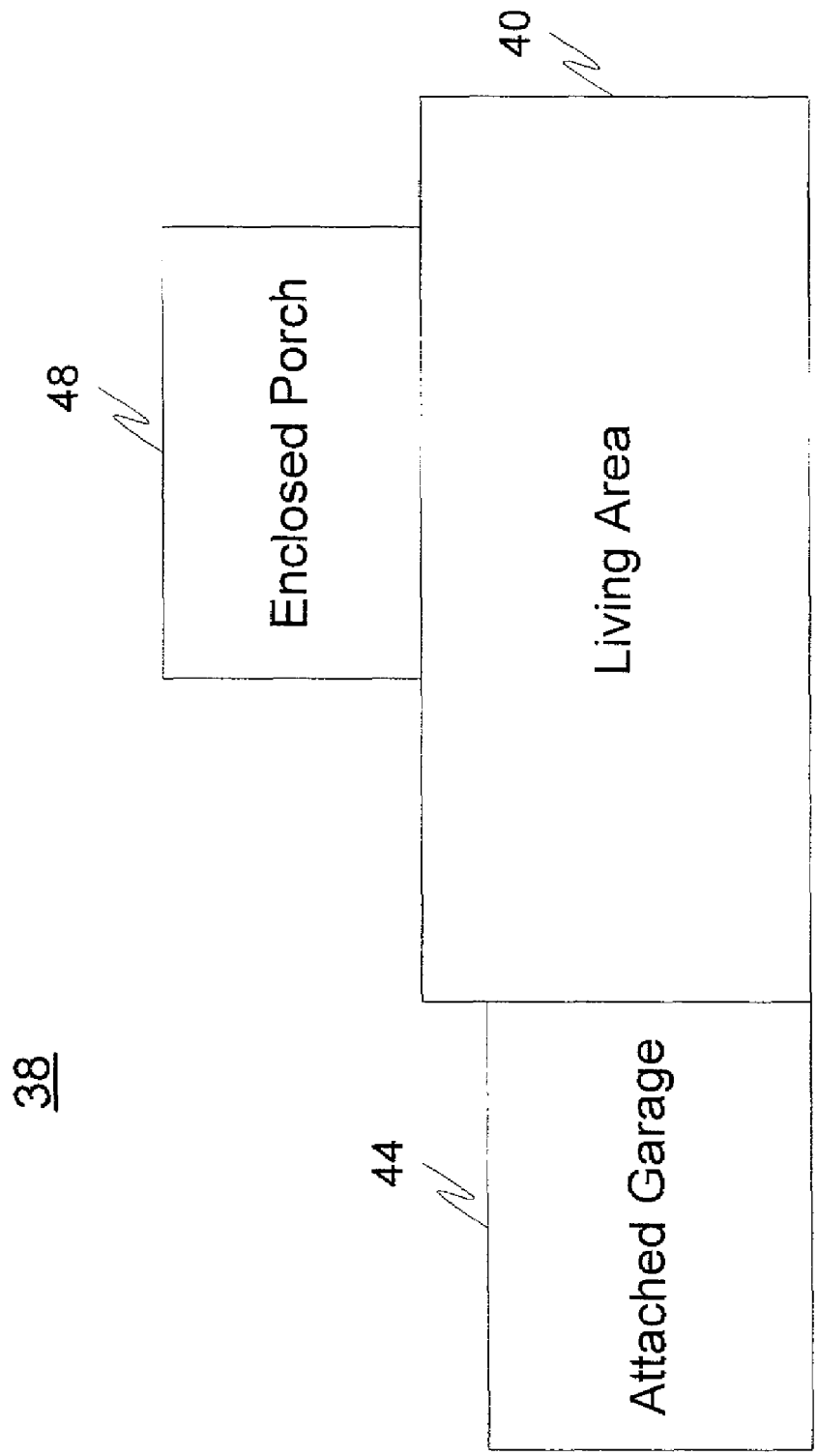
FIG. 1B is a plan view of a residential building for use in explaining an operation of the system of FIG. 1A.

For estimating a replacement cost of residential building 38 of FIG. 1B, the user inputs geographic-location data for the building 38, such as ZIP code, postal code, municipality, state, county, province, region, prefecture or the like, to the processor 22 by means of the input device 26. The user also inputs building-area type data for each of the building-area types within building 38, namely, the living area 40, the attached garage 44, the enclosed porch 48 and an unfinished basement (not shown for purposes of simplicity and clarity).

The database 30 stores per-unit-area pricing data indexed by geographic location and building-area type. In certain embodiments, per-unit-area pricing data is stored as a single value for a given geographic location and building-area type. The processor 22 accesses the relevant pricing data from the database 30 using the geographic location data and the building-area type data input by means of the device 26. In certain other embodiments, per-unit-area pricing data is stored as a price-index value for the relevant geographic location and an area factor for the relevant building-area type. The price-index value and the area factor are accessed by the processor 22 from the database 30 using the input geographic-location data and the building-area type data. In such other embodiments the processor 22 produces the per-unit-area pricing data by multiplying the retrieved price-index value by the relevant building area-type data.

The per-unit-area pricing data, or else the price-index value and area factor, depending on the embodiment, are compiled by surveying builders who work in the relevant geographic locations, and to a limited extent in certain embodiments, by resort to independent appraisal firms to identify unusual pricing pockets within certain geographic locations. The data thus obtained represents full per-unit-area pricing from the builder to the building owner, and thus is not dependent on assumptions such as a presumed builder profit margin that is likely to vary from location to location.

In certain survey techniques used to compile reconstruction-cost data, builders are asked to provide full reconstruction-price data based on building location and building type (categorized by architectural style, quality and type of construction, and building size and shape), as well as by type of area within a building to be reconstructed. The surveyed builders are categorized according to the types of buildings they construct. The data thus obtained are compiled by geographic location, building type and type of area within a building. After compilation, the data are averaged to provide the data to be stored in database 30 for conducting reconstruction cost estimates. In certain embodiments the resulting data are stored without further adjustment for use in producing reconstruction cost estimates (also referred to herein as "appraisals"). In other embodiments the data are adjusted to back out certain special features which might or might not be present in a given building to be appraised. In either case, whether so adjusted or unadjusted, such data is referred to herein as either "full reconstruction-pricing data", "full reconstruction pricing-index data", "full price index", or "full per-unit-area pricing data", as appropriate.

In certain ones of the foregoing embodiments, the processed survey results are stored in the database as, (a) full pricing-index data for each geographic location (broken down, for example, by ZIP or postal code), (b) comparative building-category data (to adjust selected pricing-index data according to the type of building to be reconstructed) and (c) comparative building-area data (to adjust the pricing index for the areas within the building being reconstructed). Accordingly, in these embodiments a category or type factor is assigned to a given building based on its architectural style, its quality, its shape, its size, and its type of construction. This factor is derived by the processor 22 based on data input by means of the input device 26 and is applied by the processor 22 along with the building's geographic location, to retrieve a corresponding type factor from the database 30. The retrieved type factor is then used to adjust the full per-unit-area pricing data based on the overall characteristics of the building within the relevant geographic location.

After the processor 22 has produced or obtained the full per-unit-area pricing data corresponding to each of the building areas within the building 38, that is, the living area 40, the attached garage 44, the enclosed porch 48 and the unfinished basement, based on the building's geographic location and the respective building-area types, it proceeds to produce an estimated reconstruction cost for the building. In certain embodiments it calculates a reconstruction cost for each of the building areas by multiplying the total area size (for example, in square feet) by its respective per-unit-area pricing data with or without certain adjustments, and then obtains an overall reconstruction cost for the building by totaling the calculated reconstruction costs for all of the building's areas.

In some embodiments, the full per-unit-area pricing data are not adjusted, but simply multiplied by the area's size to derive a reconstruction cost for that area within the building. But in other embodiments, certain adjustments are made based on additional available data. For certain ballpark or rough estimate calculations for residential buildings, adjustments are made to the full per-unit-area pricing data for living areas based on limited additional data such as roof type and type of exterior wall covering. In certain embodiments, living areas include bedrooms, bathrooms, kitchens, dining rooms, living rooms, family rooms, and the like. For estimates based on exterior appraisal data that includes additional information such as foundation type, number of chimneys, window styles, and so on, still further adjustments are made. For estimates based on full appraisal data, both exterior and interior, still further adjustments are made. Examples of the various foregoing methods are provided herein below.

The invention, as noted above is not limited to residential building reconstruction cost estimates, but is applicable to all types of buildings and spaces within buildings. In certain further embodiments, additions and alterations-type estimates (also known as "A&A" estimates) for reconstruction of cooperative and condominium apartment space and the like, are also provided within the scope of the invention. Examples of such embodiments are likewise provided herein below.

FIG. 2 illustrates an embodiment of a networked system 50 in accordance with certain embodiments of the invention. The system 50 includes processor 22 and database 30. The processor 22 communicates with a user system 62 via a network 58 to which the processor 22 is coupled by means of a communication device 66.

As in the embodiment of FIG. 1A, the processor 22 receives the data necessary for carrying out a reconstruction cost appraisal communicated from a user. In this embodiment, however, the user communicates the necessary data through user system 62 coupled in a client/server relationship with system 50 via the network 58. After receipt of the necessary data in processor 22, it accesses the relevant pricing data from database 30 and produces the requested reconstruction cost estimate in the same manner as explained above in connection with FIG. 1A. The processor then communicates the produced estimate to the user system 62 via the network 58 for presentation to the user.

Figure 3A:
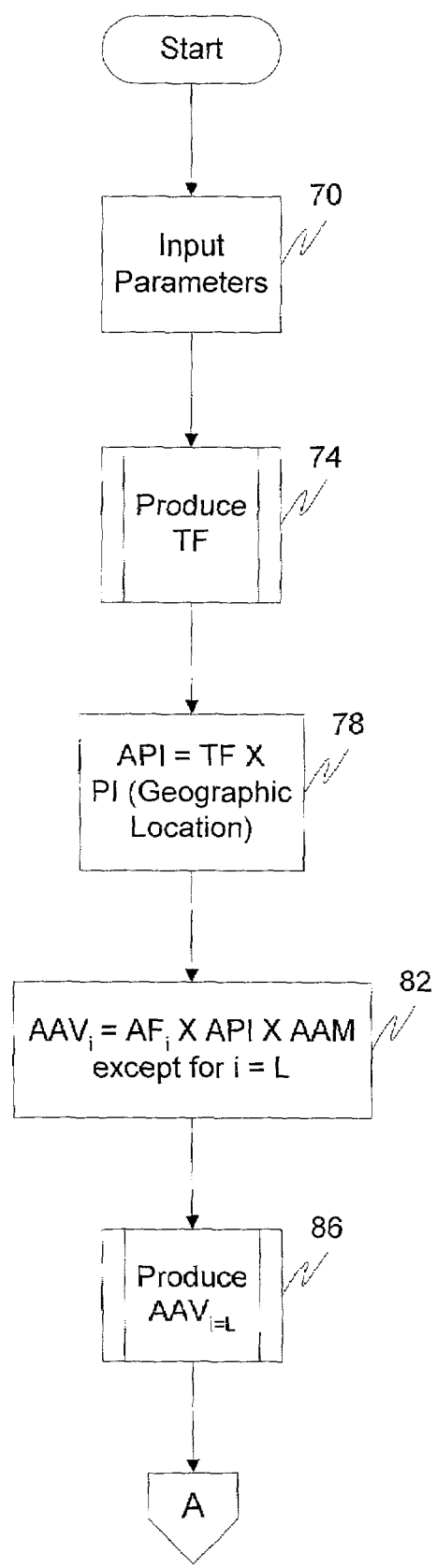
FIGS. 3A and 3B together provide a flow diagram of a main module of a building reconstruction cost appraisal method in accordance with certain embodiments of the present invention.
Figure 3B:
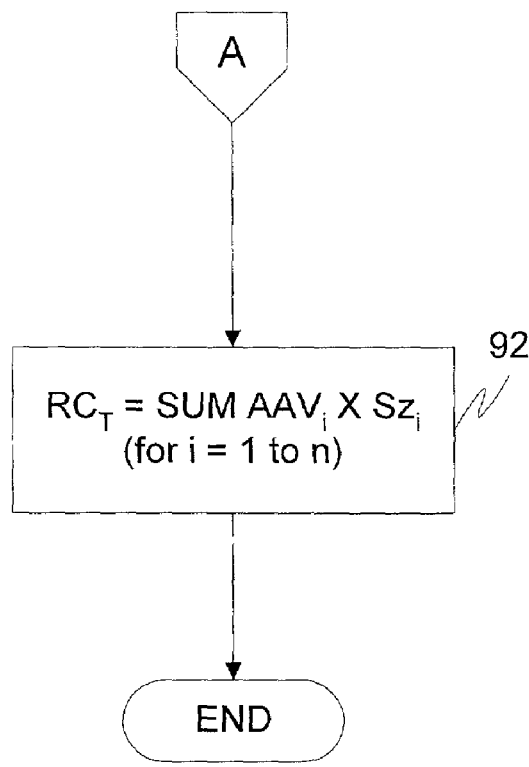

FIGS. 3A and 3B together are a flowchart for a main module of a process for selectively producing reconstruction cost estimates for either a whole residential building or for interior space on an A&A basis, in accordance with certain embodiments of the present invention. The process enables the production of estimates on either a ballpark basis or a full appraisal basis for either a whole structure or an interior space, as well as on an exterior appraisal basis for a whole structure.

The process commences with the input by the user of the parameters necessary for producing the estimate, as indicated at 70 in FIG. 3A. This is most easily, but not necessarily, accomplished with the help of an interactive visual presentation to the user with fields to insert the required data and prompts to alert the user to the fields that must be populated. In the particular embodiment of FIGS. 3A and 3B, the data required for each type of appraisal includes the state and ZIP code of the building being estimated and a list of the building-area types within the building and their respective sizes and ages. For a whole structure appraisal, in addition architectural style, quality of construction, building shape and type of construction data are supplied. However, for an A&A appraisal, in addition the number of rooms of the unit being appraised, the number of floors or levels therein, the number of such rooms having paneling or wall coverings, the proportion of the unit that has been touched by an interior decorator or designer and the proportion of the unit having moldings or trim, are employed.

After the required data has been input, the system assigns a type factor (TF) to the building based on such data. The type factor, determined in step 74 of FIG. 3A, serves to adjust a full price index (PI) for the building's geographical location, obtained by the processor 22 from the database 30, according to type-factor data obtained from the database 30 corresponding to certain overall characteristics of the building being appraised. More specifically, the processor 22 multiplies the price index (PI) by the assigned type-factor data (TF) in step 78 in order to obtain an adjusted price index (API). Examples of routines for producing the type factor (TF) are provided herein below in connection with FIGS. 4 and 5 for a whole structure appraisal and for an A&A appraisal, respectively.

Once the adjusted price index (API) for the building being appraised has been determined in step 78, an adjusted area value of each area i within the building ($AAV_i$), except for a living area i=L, is produced in step 82 of FIG. 3A. The adjusted area value ($AAV_i$) provides a separate per-unit-area reconstruction cost for each area i within the building being appraised. The adjusted area value ($AAV_{i=L}$) for the living area is produced in a subsequent step 86.

Each of the adjusted area values ($AAV_i$) is based in part on an area factor for the corresponding area i ($AF_i$) obtained from the database 30 and corresponding to the type of area within the building within its geographic location. For each area i within the building, with the exception of the living area i=L, the corresponding adjusted area value ($AAV_i$) is obtained by multiplying its area factor ($AF_i$) by the adjusted price index (API) and by an adjusted age multiplier (AAM) that is based on the age of the building. For residential buildings, in certain embodiments the adjusted age multiplier (AAM) increases with the age of the building. In addition, for residential buildings that have been renovated, in certain embodiments the adjusted age multiplier (AAM) is reduced by a predetermined value. The values assigned to the adjusted age multiplier (AAM) are based on information supplied by builders. More specifically, when surveyed the builders are asked to provide their per-unit-area reconstruction pricing as it varies with the age of the building and depending on whether or not it has undergone recent renovation. Then the aggregated and grouped data are examined for variations with age, in order to determine those points on the building-age scale at which significant pricing changes are apparent. These points are used to mark the boundaries or break points for a quantized pricing scale. That is, all buildings that fall between the same two boundaries or break points are assigned the same adjusted age multiplier (AAM) representing the relative cost of reconstruction for buildings within such boundaries or break points.

In certain embodiments of the invention, the adjusted area value for the living area ($AAV_{i=L}$) is produced in a manner differing from the procedure described above in connection with step 82. In such embodiments, the manner in which the adjusted area value for the living area ($AAV_{i=L}$) is produced depends on the type of building being appraised (for example, whole structure or A&A) and the extent of the appraisal (for example, a ballpark appraisal, exterior appraisal or full appraisal). Certain embodiments of various routines for producing the adjusted area value for such a living area that are useful for conducting whole structure and A&A-type appraisals, as well as for conducting ballpark, exterior and full appraisals are described below in connection with FIGS. 6, 12a and 12B.

With reference again to FIGS. 3A and 3B, once the various adjusted area values for each of the areas i have been determined in the foregoing steps, the total reconstruction cost estimate for the building under consideration ($RC_T$) is produced by the processor 22 in step 92 of FIG. 3B. The total reconstruction cost estimate ($RC_T$) is determined as the sum of the values obtained by multiplying each of the adjusted area values ($AAV_i$) by the size of the corresponding area i ($Sz_i$) for all of the areas within the building i=1 to n. In the simplest case, the building includes only one area, and the total reconstruction cost is obtained simply by multiplying its adjusted area value by the size of such area.

Figure 4:
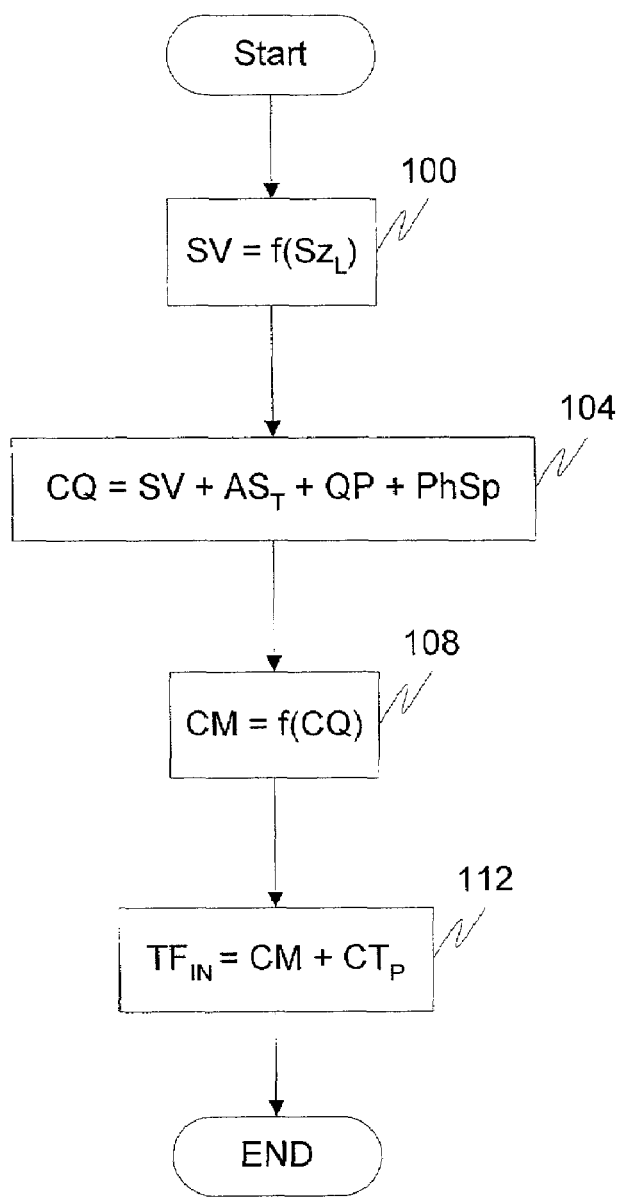
FIG. 4 is a flow diagram of a type factor routine for a whole structure appraisal within the method of FIGS. 3A and 3B.

The flowchart of FIG. 4 illustrates a type-factor routine useful in the routine 74 of FIG. 3A for producing a type-factor index ($TF_{IN}$) for accessing a corresponding type factor (TF) from the database 30 in certain embodiments of a whole structure appraisal for a residential building, both for ballpark and exterior appraisals, and full appraisals.

In step 100 of the FIG. 4 routine, a size value (SV) is produced by the processor 22 as a function of the size of the building's living area ($SZ_L$). In general, the larger the building's living area, the more a builder will charge to reconstruct the building on a square foot basis. As an example, in certain embodiments residential buildings having a total living area under a predetermined size are assigned the lowest size value (SV). Buildings having progressively larger total living areas are assigned progressively higher size values (SV), each representing a progressively greater reconstruction cost on a per-unit-area basis. Once again, appropriate size values (SV) are produced by surveying builders to learn how much they would charge to reconstruct a living area according to its size. The data thus obtained are aggregated and grouped according to living area size. The aggregated and grouped data are examined for variations in pricing, in order to determine those points on the living area-size scale at which significant pricing changes are apparent. These points are used to mark the boundaries or break points for a quantized living area size-value scale. That is, all buildings that fall between the same two boundaries or break points are assigned the same living area-size value in order to distinguish such buildings from those falling between different boundaries or break points.

In step 104, a construction quality (CQ) is produced based on the building's size value (SV) as well as numerical values assigned to qualitative building characteristics input by the user, namely, a designation of the building's architectural style, its overall quality and its general shape. The assigned architectural style value ($AS_T$) assigns a weight to the building depending on whether its architectural style is (a) A-Frame, (b) Adobe, (c) American 4-Square, (d) Architecturally Unique, (e) Basic, (f) Bi-level or (g) Brownstone. Both builders and architects are surveyed to obtain reconstruction prices based on varying building structure complexities and construction practices.

The aggregated reconstruction price data are examined on scales of structural complexity and construction practices, to detect where on the scales significant pricing changes are apparent. These pricing change points are used to group various architectural styles according to relative pricing and assign weights to each group reflecting their relative cost differences.

The value assigned to the building's overall quality, the quality of premises (QP) value, is selected from a range of integers selected according to the number of quality grades provided in the system. For example, a value of 1 may be assigned to a lowest quality level and a value n>1 assigned to the highest quality level. Essentially, the quality assigned to a given building depends on the craftsmanship and cost of the individual items within the building that have a material impact on price. Such items can include, for example, types of roof coverings, flooring and wall coverings, quality of trim and moldings, types of fixtures, and whatever else builders regard as materially affecting the price of reconstruction. The separation of buildings into the various quality levels are based on survey data obtained from builders reflecting their views on quality as well as the relative cost to purchase the different types of building materials and fixtures incorporated in such items.

Lastly, a value PhSp is assigned to a physical shape of the building, ranging from a lowest value assigned to structures having a simple shape, such as a square-shaped building, through progressively higher values assigned to more complex shapes, with a uniquely-shaped building being assigned a highest value. Similarly to the quality of premises value, the value PhSp is selected from a range of integers selected according to the number of different gradations to be assigned to this value according to building shapes. The values to be assigned to each shape are based on the results of builder surveys in which they are asked to provide reconstruction prices for buildings having various shapes ranging from the very simple to the complex and uniquely-shaped buildings. Then the construction quality (CQ) is obtained as the sum of the values SV, $AS_T$, QP and PhSp, as indicated in step 104 of FIG. 4.

In a further step 108 the construction quality (CQ) is scaled to a predefined range of values for assigning progressively larger type factor indices ($TF_{IN}$) to progressively larger construction quality values (CQ). The scaling function again is based on reconstruction pricing data from builders and architects. Building types and their aggregated reconstruction costs (obtained from the surveys), categorized by size, architectural style, overall quality, general shape and construction practice (that is, wood frame, metal frame, steel frame, framing used to support veneer), are examined based on these categories or scales for pricing change or break points. The pricing break points provide the boundaries for separating the building types according to type factor index ($TF_{IN}$). However, the primary categorization is formulated according to construction practices, with the remaining categories serving to provide subsidiary grades within the primary categorization. The scaled quality factor is designated a construction model (CM). The building is also classified according to its type of construction, with each type assigned to a respective class in each of which fall construction types that are comparably expensive to build on a per-unit-area basis. Again, such classifications are based on the results of surveys in which builders are asked how much they charge to reconstruct buildings according to their type of construction. In certain embodiments stick, log and A-frame construction types are grouped into a common class, while brick and stone masonry construction types are grouped into a different common class. Each class is assigned a unique construction type value ($CT_p$).

The type factor index ($TP_{IN}$) is set equal to the sum of the values CM and $CT_p$ for the building under consideration, as indicated in step 112 of FIG. 4. The ranges of possible values for CM and $CT_p$ are selected so that each combination of any given value of CM and any given value of $CT_p$ will produce a unique type-factor index ($TF_{IN}$). In this manner, the database 30 can separately store any desired value for each type factor (TF) in each geographic location, and the desired value for each type factor (TF) corresponding to the type-factor index ($TF_{IN}$) can accurately reflect the cost of construction for buildings of that type within the corresponding geographic location.

The flowchart of FIG. 5 illustrates the routine 74 of FIG. 3A arranged to produce a type-factor index ($TF_{IN}$) in certain embodiments of an A&A appraisal for a residential building, both for ballpark and full appraisals.

In a step 116 in FIG. 5, the user inputs data required for the type-factor index ($TF_{IN}$) determination and the processor 22 scales the input data for the purpose of carrying out subsequent calculations. Such data includes the number of rooms in the unit, which is scaled so that units having fewer than 3 rooms receive a minimal room number value (NR), those having either 3 or 4 rooms receive a larger room number value (NR) and those having 5 or more rooms receive a highest room number value (NR). The input data also includes the number of floors or levels in the unit, which is scaled so that a unit having only 1 floor or level receives a minimal value for the number of floors or levels (NF/L), while a unit having 2 levels receives a higher value NF/L and a unit having 3 or more floors or levels receives a highest value NF/L.

The user also inputs the number of rooms in the unit having paneling or fabric wall coverings, which is scaled to produce a value NRP/F, so that units having only 1 such room receive a minimal value for NRP/F, while those having 2 such rooms receive a higher value for NRP/F and those having more than 2 such rooms receive a highest value of NRP/F. In addition, the user inputs a percentage of the unit touched by an interior decorator or designer, which is scaled so that if less than the first percentage is touched, a value % ID receives a minimal value, but if less than a second higher percentage (but more than the first percentage) is touched the value % ID receives a larger value and if a still greater percentage is touched, the value % ID is highest. Lastly, the user inputs a percentage of the unit having moldings and trim, which is scaled to a value % M/T so that a minimal value is assigned thereto for a unit having moldings and trim in less than a first percentage of its areas, a larger value is assigned thereto if the unit has moldings and trim in an amount higher than the first percentage, but less than a second higher percentage of its areas and a highest value is assigned thereto if the unit has moldings and trim in more than the second, higher percentage of its areas.

In a step 120, a size value for the A&A appraisal ($SV_{A\&A}$) is produced by the processor 22 based on the total size of the living area of the unit. The value $SV_{A\&A}$ is produced by scaling the total living area size in square feet, so that a minimal value is assigned to a minimal size, and progressively larger values are assigned to units having a larger total living area to a maximum value $SV_{A\&A}$ for units having a size greater than a maximum threshold.

The manner and the ranges in which the building units are categorized and assigned values according to number of rooms, total living area size, number of floors or levels, and the number of rooms having paneling or fabric wall coverings, as well as the first and second percentages used to categorize the extent of the unit touched by an interior decorator or designer and the extent of the unit having moldings and trim, are determined by examining how the aggregated reconstruction cost data supplied by the builders in response to the surveys, vary according to such number of rooms, number of floors or levels, and so on. Where the aggregated data reveals points on the number of rooms scale, the number of floors or levels scale, and so on, where significant changes in pricing are apparent, these points are used to mark the boundaries or thresholds for quantizing and categorizing a given unit according to where it falls on each scale. For example, units that fall within the same two percentage thresholds in terms of the percentage of such units having moldings and trim, are assigned the same value % M/T.

Thereafter, the processor 22 in step 124 produces a construction quality value CQ by adding the values NR, NF/L, NRP/F, % ID, % MT and $SV_{A\&A}$. In a step 128, the value CQ is scaled to a construction model value CM ranging from a minimal value of 1 corresponding to increasing values of CQ up to a maximum value of 5 in integer steps. The scaling function is based on reconstruction pricing data from builders and architects. Unit types and their aggregated reconstruction costs (obtained from the surveys), categorized by number of rooms, number of floors or levels, number of rooms with paneling or fabric wall coverings, extent of the unit touched by an interior decorator or designer and extent of the unit having moldings or trim, are examined based on these categories or scales for pricing change or break points. The pricing break points provide the boundaries for separating the building types according to construction model CM. In certain embodiments, the value of CQ is used directly along with the geographic location data to access the type factor TF from the database 30. In certain other embodiments, a construction factor CF corresponding to the construction factor $CT_p$ of FIG. 4 for the simplest construction types for whole structures is added to the value CQ to produce $TF_{IN}$. Then $TF_{IN}$ is used to access a corresponding type factor from the whole structures database. In this latter procedure, the value of API in step 78 of FIG. 3A is multiplied by a factor less than 1.0 in order to adjust it for use in an A&A appraisal. The adjustment factor is determined by subtracting from the whole structure pricing those aspects which are not included in an A&A appraisal, such as the foundation, roof, and exterior features.

As noted above, in certain embodiments the procedure for determining the adjusted area value for the living area, both for a whole structure appraisal and an A&A appraisal varies depending on whether the appraisal is a ballpark, exterior or full appraisal of a whole structure or else a ballpark or full A&A appraisal. These various procedures are now described separately.

Figure 6:
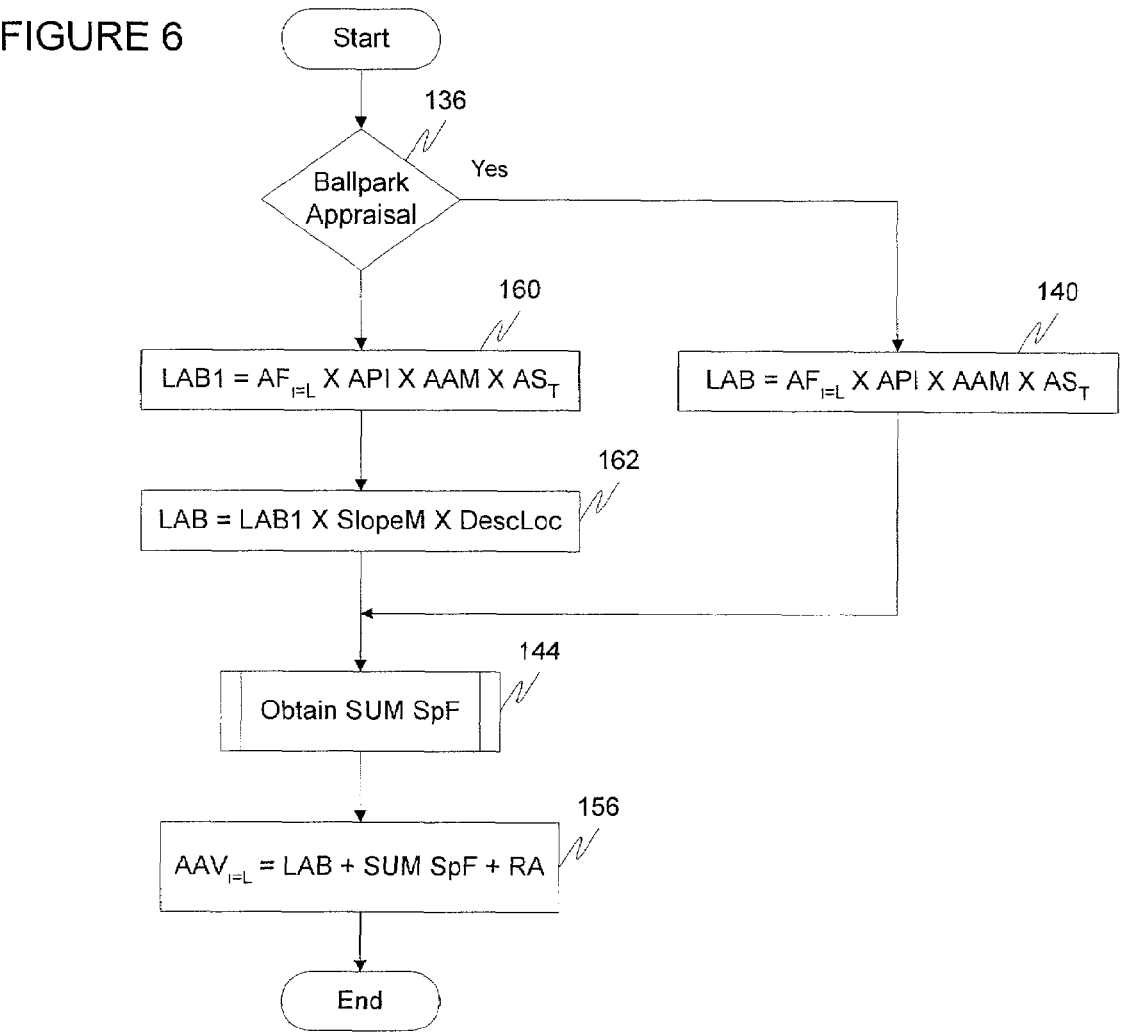
FIG. 6 is a flow diagram of a total living area routine for a whole structure appraisal within the method of FIGS. 3A and 3B.

With reference to FIG. 6, a main procedure for determining the adjusted area value for the living area $AAV_{i=L}$ in a whole structure appraisal is illustrated. While the main procedure of FIG. 6 is applicable for ballpark, exterior and full appraisals of whole structures, these are now separately described.

Where the user has selected a ballpark appraisal for a whole structure of a building, the procedure of FIG. 6 branches in a step 136 to a step 140 in which a living area base value (LAB) is produced by the processor 22 based on the user's inputs and data from the database 30. For this purpose the processor 22 accesses the area factor ($AF_{i=L}$) for the living area in that geographic location from the database 30, as well as the values of the adjusted price index (API) and the adjusted age multiplier (AAM), previously determined in the procedure described above in connection with FIG. 3A, and the architectural style factor ($AS_T$) previously determined in the routine described in connection with FIG. 4. The living area base value is then obtained by multiplying the values $AF_{i=L}$, API, AAM and $AS_T$.

In the ballpark appraisal, certain limited special features of the building are also used in determining the appraised reconstruction cost. In certain embodiments, the area factors ($AF_{i=L}$) are selected to exclude pricing for special features, in anticipation that these will be later accounted for in the appraisal procedure. A special features routine for a whole structure appraisal is carried out as indicated in step 144 of FIG. 6, and illustrated in greater detail in FIGS. 7A and 7B.

Figure 7A:
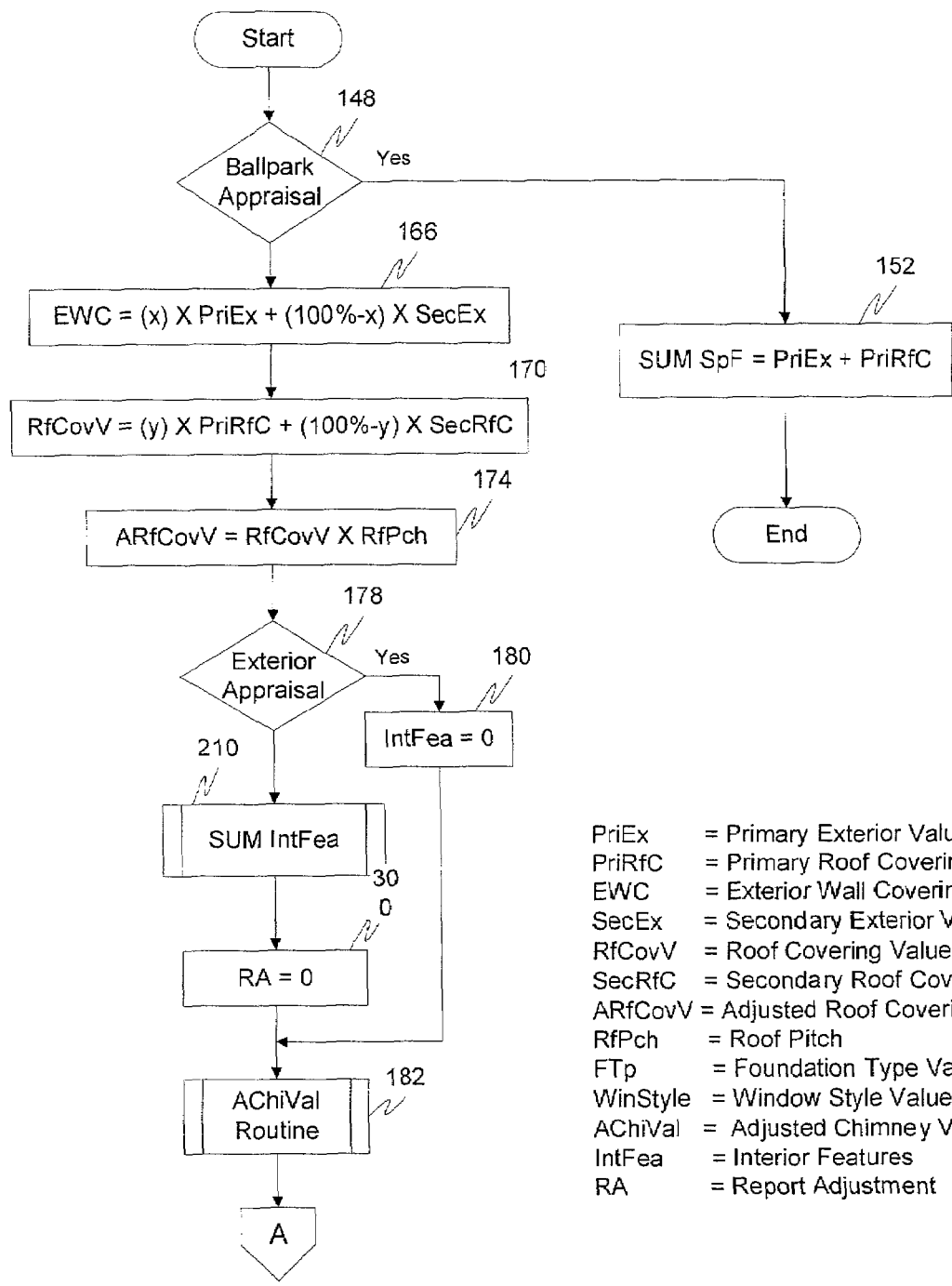
FIGS. 7A and 7B together provide a flow diagram of a special features routine for a whole structure appraisal within the routine of FIG. 6.

In the routine of FIG. 7A, where the user has selected a ballpark appraisal the procedure branches at a step 148 to a further step 152 where certain special feature values are determined and totaled to produce a special features total value (SUM SpF). To obtain a special features value for a primary exterior type input by the user, the processor 22 accesses a value therefor (PriEx) from the database 30 corresponding to the selected primary exterior type, geographic region (for example, northeast United States, mid-Atlantic US, southeast US, mid-west US, southwest US and northwest US) and the quality of premises value (QP) previously determined in the procedure of FIG. 4. The processor 22 also obtains a value PriRfC from the database 30 based on a user input of data indicating a type of primary roof covering of the building and geographic region as well as the quality of premises value (QP). The processor 22 then adds the values PriEx and PriRfC to obtain the value SUM SpF.

The values to be assigned to PriEx and PriRfC according to the quality of premises value (QP) and the type of exterior or roof covering, are determined through a methodology that is used throughout in the embodiments discussed in connection with FIGS. 7A and 7B to 12A and 12B in determining the various special features values discussed herein below.

Builders are surveyed to learn what they would charge to fully reconstruct buildings having characteristics, including special features, which typify average buildings within each of the quality classes designated by the various quality of premises values (QP). Also, the builders are surveyed to determine what they would charge for labor and materials to replace the typical exterior wall covering and typical roof covering (as well as typical special features of all other types described herein below) in a typical building within an average one of the quality classes. The various answers are aggregated according to quality classification and geographic region to obtain an average overall reconstruction cost for a typical building within each classification and region. In addition, the replacement costs of each of the various special features for the typical building within the average quality class are aggregated to obtain a base replacement cost for each of the special features in an average quality building in each region.

Since the cost to replace the typical special feature in the average quality building is included in the cost of reconstructing such a building, it is assigned a special features value of zero.

The cost to replace each special feature also depends on the type of material used, if it differs from the material typically used in constructing such special feature within the average quality classification. Also, the use of materials different from those typically used to construct a given special feature often entails a differing level of craftsmanship to install it, and possibly variations in related aspects of the building. For example, if a building has a slate roof covering, it is likely that a higher cost of materials will be incurred than for a standard asphalt composition roof covering and the level of craftsmanship required to reconstruct such slate roof covering would be relatively higher. Also, the greater size and/or number of the beams supporting the roof having the slate roof covering than those required to support an asphalt composition roof covering, would result in a higher reconstruction cost for this related aspect of the building.

Accordingly, the special features are also assigned replacement cost values based on the kinds of materials used. In order to derive such special features values for special features constructed of materials which are not typical within the average building classification, the base special features value for each such special feature is extrapolated based on relative costs of materials, labor and/or ancillary building features. For example, if the base special features value on a per-square-foot cost basis to replace a standard asphalt composition roof covering within the average classification is $5, and a cost to replace a standard-grade slate roof covering within such average classification (based on materials, labor and ancillary special features costs) is $7 per square foot, a special features value of $2 per square foot can be assigned to such a standard-grade slate roof covering for a building within the average classification (since the standard roof covering is assigned a zero special features value).

The costs of such materials, labor and related building materials are obtained from various sources. Information concerning the types of materials used in a building of a given quality to construct special features, as well as the level of craftsmanship and associated labor rates are obtained from builder surveys, as are data on the impact of using differing material qualities and characteristics on the cost to replace ancillary building features. Material cost data are obtained from suppliers. The reconstruction costs thus produced are also adjusted from time to time based on appropriate government economic data.

In addition, in order to extrapolate the cost to replace each special feature for a building within a quality classification differing from the average classification, a quality classification factor is derived for each differing classification in each geographic region equal to the ratio of (a) the overall reconstruction cost of a typical building within such differing classification, to (b) the overall reconstruction cost of a typical building within the average quality classification. The replacement costs for each special feature for each of the various materials used is multiplied by each quality classification factor to obtain replacement costs for all special features embodying each of the various available materials in each of the building quality classifications and region. Lastly, the base replacement cost is subtracted from each of the various replacement costs for each corresponding special feature, to obtain each special features value to be stored in an appropriate table for the corresponding special feature in the database 30.

With reference again to FIG. 6, in a step 156 the processor 22 produces the value $AAV_{i=L}$ as the total of the living area base (LAB), the sum of special features (SUM SpF) and a report adjustment value (RA) which serves to account for those special features not included in the ballpark appraisal. The value RA in certain embodiments is a fixed value for buildings of all quality of premises values (QP). In other embodiments, the value RA varies with the value QP.

The RA value or values for a ballpark appraisal are produced based on the estimated total cost to reconstruct a typical building of average quality having the least expensive special features commonly found in such a building, less the cost to replace the roof covering and exterior features as described above. (The various special features that are taken into consideration in the various types of appraisals are identified herein below in connection with an explanation of a whole structure full appraisal.) The estimated cost to reconstruct such a building is obtained as discussed herein above in connection with the methodology for obtaining special features values.

The average replacement costs for all such special features found in such a typical building are summed, less the replacement costs for the primary exterior and primary roof covering special features that are separately accounted for in the ballpark appraisal. The ratio of the sum of the replacement costs of such special features to the estimated total cost to reconstruct such typical building, is multiplied by the per-unit-area cost to reconstruct such typical building in order to obtain a basic report adjustment value (RA) for such typical building within the average quality classification.

In a whole structure ballpark appraisal, the types, grades and characteristics of the special features included in the building being appraised (except for the primary roof covering and the primary exterior) are presumed based on the average types, grades and characteristics of special features included in buildings having the same quality of premises value (QP) as the building being appraised, determined in accordance with builder surveys. The sum of the average replacement costs for the special features presumed to be present in the building being appraised in its respective quality classification as indicated by its value QP (except for primary roof coverings and primary exterior) is inserted as the numerator of an adjustment ratio whose denominator is the sum of the average replacement costs for the special features found in a typical building in the average quality classification (excluding primary exterior and roof covering values), as described herein above. The basic report adjustment value (RA) is multiplied by the adjustment ratio to produce the report adjustment value (RA) for the ballpark whole structure appraisal of such building in its respective quality classification.

In certain embodiments the report adjustment values (RA) for ballpark whole structure appraisals are determined before the system is put to use in making appraisals and stored in database 30 indexed by quality of premises value (QP).

Once the value $AAV_{i=L}$ has been determined in the routine of FIG. 6, processing returns to step 92 of FIG. 3B for producing the whole structure ballpark appraisal estimate $RC_T$ for the building under consideration. As described above, the value $RC_T$ is produced by multiplying each adjusted area value $AAV_i$ by the size of its corresponding area within the building $Sz_i$, and then adding the products of all such multiplications.

A procedure for producing an exterior appraisal for a whole structure building is now described with reference to FIGS. 3A, 3B, 4, 6, 7A, 7B and 8. Turning first to FIG. 3A, the user inputs required parameters for the exterior appraisal in step 70. In addition to the data required for the ballpark appraisal described above, the exterior appraisal requires further data as described below.

The type factor routine in step 74 of FIG. 3A and FIG. 4 is carried out in the same fashion as in the ballpark appraisal, as are steps 78 and 82 of FIG. 3A. However, as will be appreciated from FIG. 6, the procedure for determining $AAV_{i=L}$ for the exterior whole structure appraisal differs from that of the ballpark whole structure appraisal. As shown in FIG. 6, if an exterior whole structure appraisal is being carried out, the procedure branches from step 136 to a step 160 in which a value LAB1 is produced in the same manner and using the same data as used in step 140 described above.

In a step 162, the processor 22 produces a living area base (LAB) for the exterior whole structure appraisal by multiplying the value LAB1 by two further values SlopeM and DescLoc. The value SlopeM is derived from a user input characterizing the slope of the building site from among a range of characterizations from "flat" through "very steep". A minimal value for SlopeM is assigned by the processor 22 to a building site deemed "flat" by the user, and progressively larger values are assigned to characterizations of progressively steeper sites up to a maximum value assigned to a site deemed "very steep". The value DescLoc is derived from a user input characterizing the type of locale in which the building is situated, for example, "beachfront", "coastal", "large city", "medium-sized city" and "small city".

The values for Slope M and DescLoc are determined from the aggregate results of builder surveys. That is, to determine the values to be assigned to SlopeM, builders are asked to provide costs of full replacement for comparable buildings situated on (a) a flat lot, (b) a slightly sloped lot, (c) a moderately steeply sloped lot, (d) one that is steep, and (e) one that is very steep. To determine the values to be assigned to DescLoc, builders are asked to provide costs of full replacement for comparable buildings located (a) on beachfront property, (b) in a coastal area, (c) in a large city, (d) in a medium-sized city, and (e) in a small city.

Figure 7B:
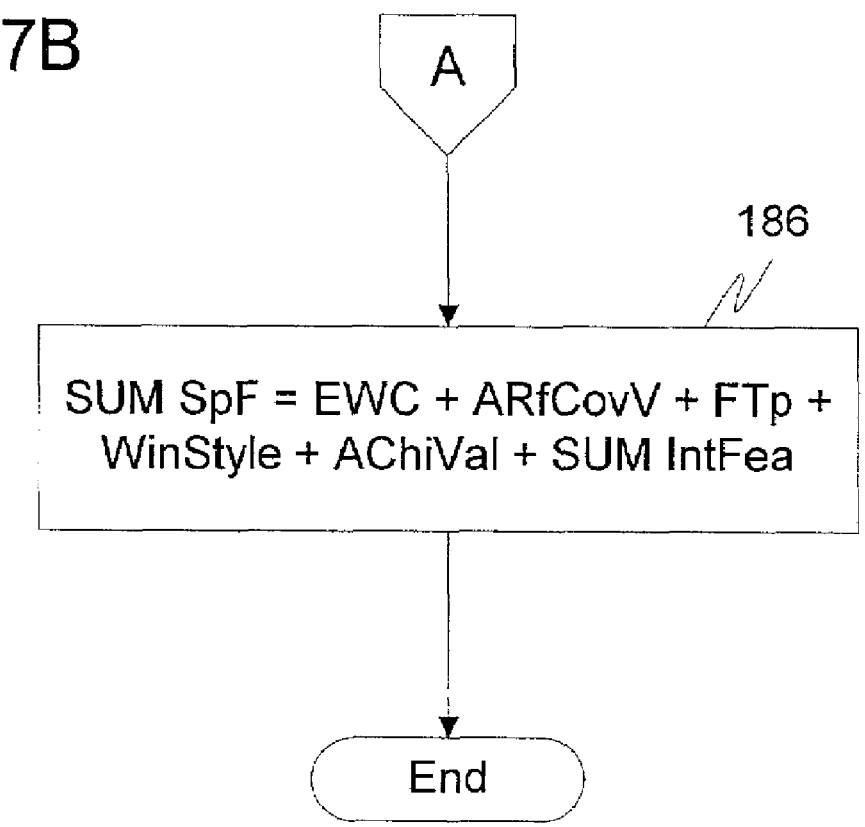

At this point the value SUM SpF is produced for the exterior whole structure appraisal in the branch from step 148 of FIG. 7A through steps 166, 170, 174, 178, 180 and 182 thereof and step 186 of FIG. 7B. In step 166 an external wall covering value (EWC) is produced based on user inputs for both the primary exterior wall covering and a secondary exterior wall covering. Based on these inputs, the geographic region and the quality of premises value (QP) determined in the procedure of FIG. 4, the processor 22 accesses respective values therefor, PriEx and SecEx, from the database 30. The value SecEx is obtained from the same data from which PriEx is obtained, based on the type of secondary exterior wall covering, the geographic region and the value QP for the building being appraised. As indicated in step 166, the processor 22 produces the value EWC by adding the value PriEx multiplied by a percentage (x) to the value SecEx multiplied by (100%−x). The value of x is determined as an average percentage extent of a building's exterior wall covered by a primary exterior material and, thus, ranges from more than 50% up to 100%. Such average percentage extent is determined based on builder surveys, direct observation of typical buildings and Internet research.

In step 170 a roof covering value (RfCovV) is produced based on user inputs for both the primary roof covering and a secondary roof covering. Based on these inputs, the geographic region and the quality of premises value (QP) determined in the procedure of FIG. 4, the processor 22 accesses respective values therefor, PriRfC and SecRfC, from the database 30. The value SecRfC is obtained from the same data from which PriRfC is obtained, based on the type of secondary roof covering, the geographic region and the value QP for the building being appraised. As indicated in step 170, the processor 22 produces the value RfCovV by adding the value PriRfC multiplied by a percentage (y) to the value SecRfC multiplied by a percentage (100%-y). The value of y is determined as an average percentage extent of a building's roof covered by a primary roof covering and, thus, ranges from more than 50% up to 100%. Such average percentage extent is determined based on builder surveys, direct observation of typical buildings and Internet research.

In step 174 the roof covering value (RfCovV) is adjusted by a factor (RfPch) assigned to the pitch of the building's roof, to produce an adjusted roof covering value (ARf-CovV). Based on the user's characterization of the roof's pitch, the factor (RfPch) is selected from a table of values ranging from a discounted value for a flat roof through intermediate values assigned to progressively steeper roofs to a maximum value for a roof indicated as "steep" by the user. The value RfPch is determined beforehand and stored in database 30, and is produced based on how the surface area to be covered varies with the pitch of the roof as it varies from an average roof pitch value. The average roof pitch value is determined from builder surveys, direct observation of typical buildings and Internet research.

In an exterior whole structure appraisal according to certain embodiments of the invention, the procedure of FIGS. 7A and 7B branches from the step 174 via steps 178, 180 and 182 to a final step 186 in which SUM SpF is produced. As indicated in step 186 SUM SpF is produced as the sum of the values EWC and ARfCovV, along with further values assigned to a foundation type of the building (FTp), a window style value for the building (WinStyle) and an adjusted chimney value (AChiVal) assigned to the building. Since the exterior appraisal does not take interior features into account, a value provided for the sum of interior special features in a full appraisal (IntFea) is set to zero in step 180 when an exterior appraisal is carried out.

Figure 8:
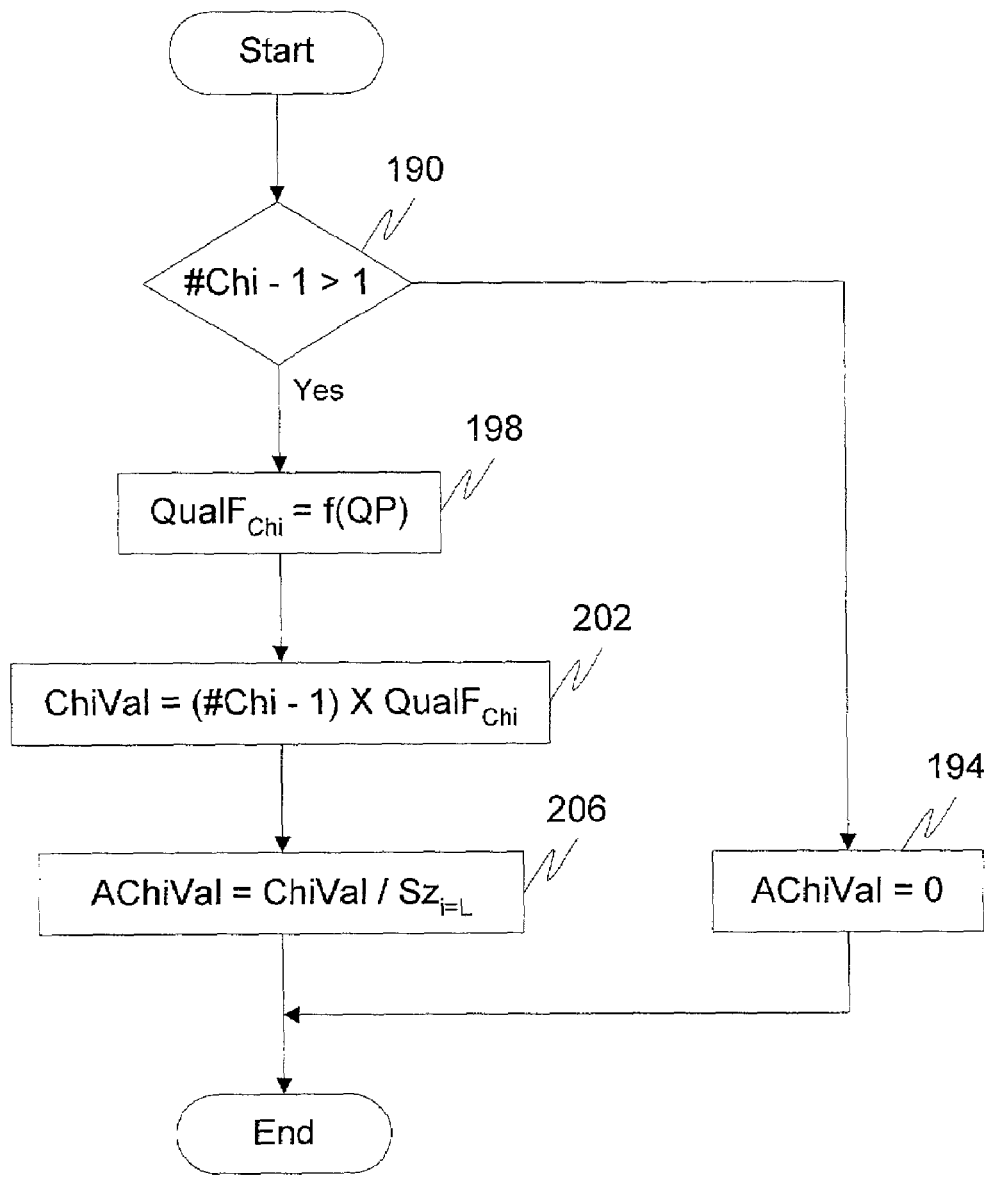
FIG. 8 is a flow diagram of an adjusted chimney value routine for a whole structure appraisal within the routine of FIGS. 7A and 7B.

AChiVal is determined by means of an AChiVal routine of step 182, which is illustrated in detail in FIG. 8. The AChiVal routine provides an adjustment to the adjusted area value for the living area ($AAV_{i=L}$) based on data input by the user indicating the number of chimneys in the building (#Chi), the geographic region as well as the quality of premises value (QP) determined as described above in connection with FIG. 4. In a step 190 it is determined whether the building has at least 2 chimneys. If not, AChiVal is assigned a value of zero in step 194 and the AChiVal routine is completed.

If however, the building has 2 or more chimneys the routine continues in a step 198 to determine a quality factor ($QualF_{Chi}$) for the building's chimneys based on the QP value. In certain embodiments, for residential buildings $QualF_{Chi}$ varies from a minimum value for a QP value of 1 up to a maximum value for a QP value of 6. The value $QualF_{Chi}$ is determined by aggregating the results of surveys in which builders are asked to provide full replacement costs for a chimney for buildings falling within each of the six classes indicated by the QP value. The values of $QualF_{Chi}$ are stored in a lookup table in database 30 indexed by the geographic region and the QP value. In a step 202 the processor 22 accesses the appropriate value $QualF_{Chi}$ based on the building's QP value and region from the table in database 30, and produces a chimney value (ChiVal) by multiplying the quality factor ($QualF_{Chi}$) by the number of chimneys (#Chi) less 1. In a step 206, the processor 22 produces the value AChiVal by dividing the chimney value (ChiVal) by the size of the living area ($Sz_{i=L}$).

With reference again to step 186 of FIG. 7B the value for the foundation type (FTp) is obtained based on the quality of premises value (QP) and the geographic region by reference to a look-up table of the database 30. The foundation type values (FTp) are produced for storage in the lookup table based on the results of builder surveys. That is, builders are surveyed to obtain full reconstruction pricing estimates by geographic region for the foundation of a typical building having an average QP value and a foundation type typical of such buildings. They are also surveyed to determine the foundation types typical of buildings falling into the other QP categories and labor costs involved in constructing such foundation types. Costs of materials for each of the foundation types are obtained from suppliers. Based on the relative costs of materials and labor, relative pricing values are obtained for each quality of construction value and used to adjust the full foundation reconstruction cost for the foundation of a building of average construction quality to obtain FTp for each value QP.

Likewise, the value for window style (WinStyle) is obtained based on QP by reference to a further look-up table of the database 30. The window style values (WinStyle) are obtained based on builder surveys and the costs of the types of windows installed. That is, builders are surveyed to obtain information identifying the window styles usually included in buildings typical of each quality classification and region, and costs of installing each different style. The costs of the windows themselves are obtained from suppliers.

The sum of special features value (SUM SpF) is then obtained in step 186, as indicated above by summing the values for external wall coverings (EWC), adjusted roof covering value (ARfCovV), foundation type (FTp), window style (WinStyle) and adjusted chimney value (AChiVal), bearing in mind that the value of SUM IntFea is set to zero in an exterior appraisal.

Returning to FIG. 6, the adjusted area value for the living area ($AAV_{i=L}$) is next obtained by summing the living area base (LAB), the sum of the special features (SUM SpF) and an report adjustment value (RA). The report adjustment value (RA) is selected to account for the limited number of special features included in the exterior appraisal in the manner discussed herein above in connection with the description of the whole structure ballpark appraisal. However, the sum of the special features explicitly included in the exterior appraisal are excluded in obtaining the basic RA value, the comparison value and the sum of the special features for the quality classification of the building being appraised.

Lastly, as in the ballpark whole structure appraisal, the exterior whole structure appraisal is completed in step 92 of FIG. 3B in which the total reconstruction cost estimate ($RC_T$) obtained as the sum of the products resulting from the multiplication of each adjusted area value for each building area i ($AAV_i$) by its respective size ($Sz_i$).

A procedure for producing a full appraisal for a whole structure building is now described, again with reference to FIGS. 3A, 3B, 7A, 7B and 8, as well as 9A, 9B, 9C, 10 and 11. Referring first to FIG. 3A, the user inputs required parameters for the full appraisal in step 70. In addition to the data required for the exterior whole structure appraisal described above, the full whole structure appraisal requires further data as described below.

The type factor routine for the full whole structure appraisal is illustrated in step 74 of FIG. 3A and in detail in FIG. 4, and is carried out in the same fashion as in the exterior appraisal, as are steps 78 and 82 of FIG. 3A. In addition, the overall procedure for determining $AAV_{i=L}$ for the full whole structure appraisal as illustrated in FIG. 6 is the same as that for the exterior whole structure appraisal.

However, the sum of special features procedure (SUM SpF) of step 144 of FIG. 6, as illustrated in detail in FIGS. 7A and 7B, also includes interior special features, as explained below. That is, the routine of FIGS. 7A and 7B carries out steps 148, 166, 170, 174, 182 and 186 in the same fashion for the full appraisal as for the exterior appraisal, but also carries out a routine for obtaining a sum of interior special features (SUM IntFea) indicated at 210 of FIG. 7A.

Figure 9A:
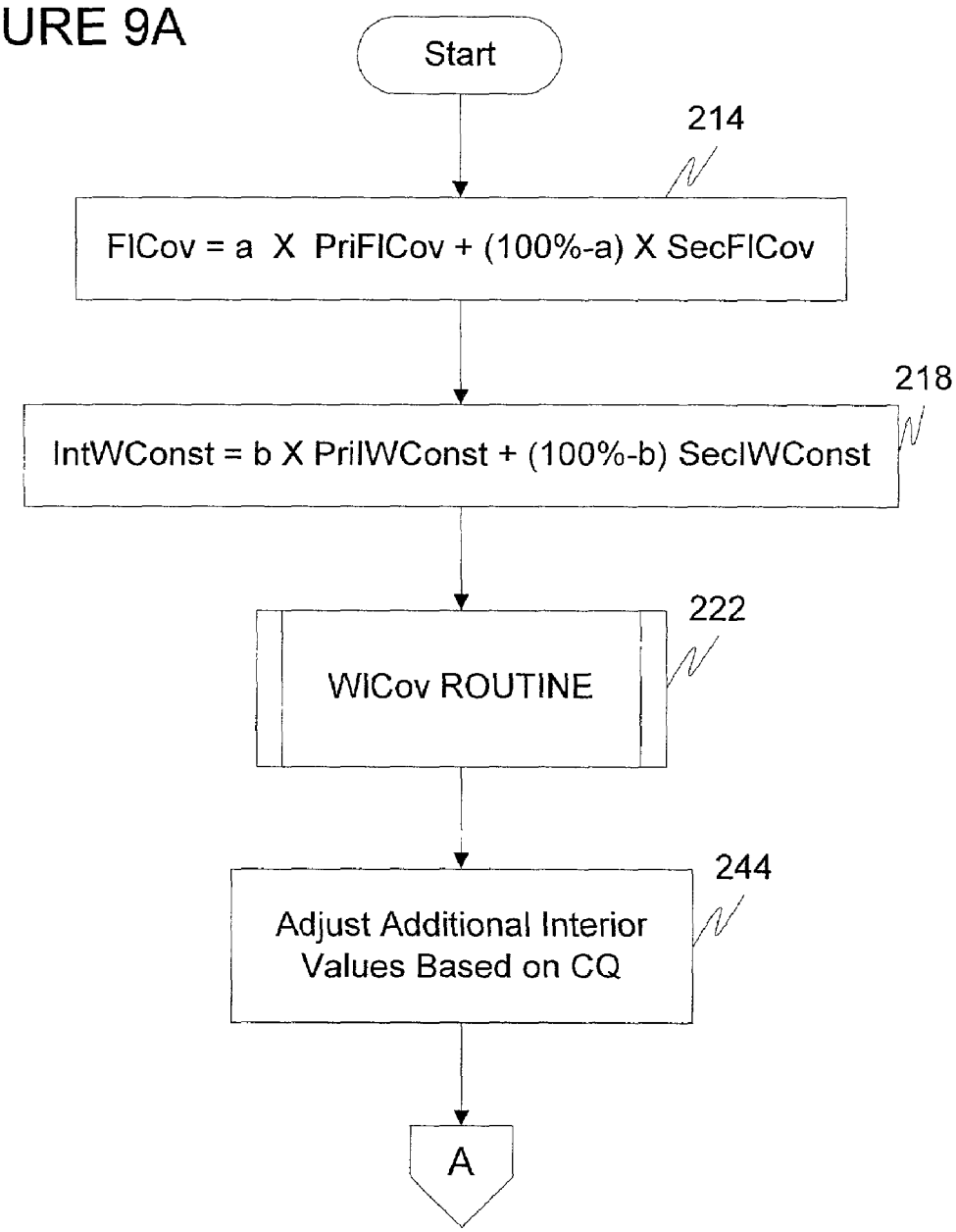
FIGS. 9A, 9B and 9C together provide a flow diagram of an interior special features routine used in both a whole structure appraisal within the routine of FIGS. 7A and 7B and in a full additions and alterations appraisal within the routine of FIGS. 12A and 12B described below.
Figure 9B:
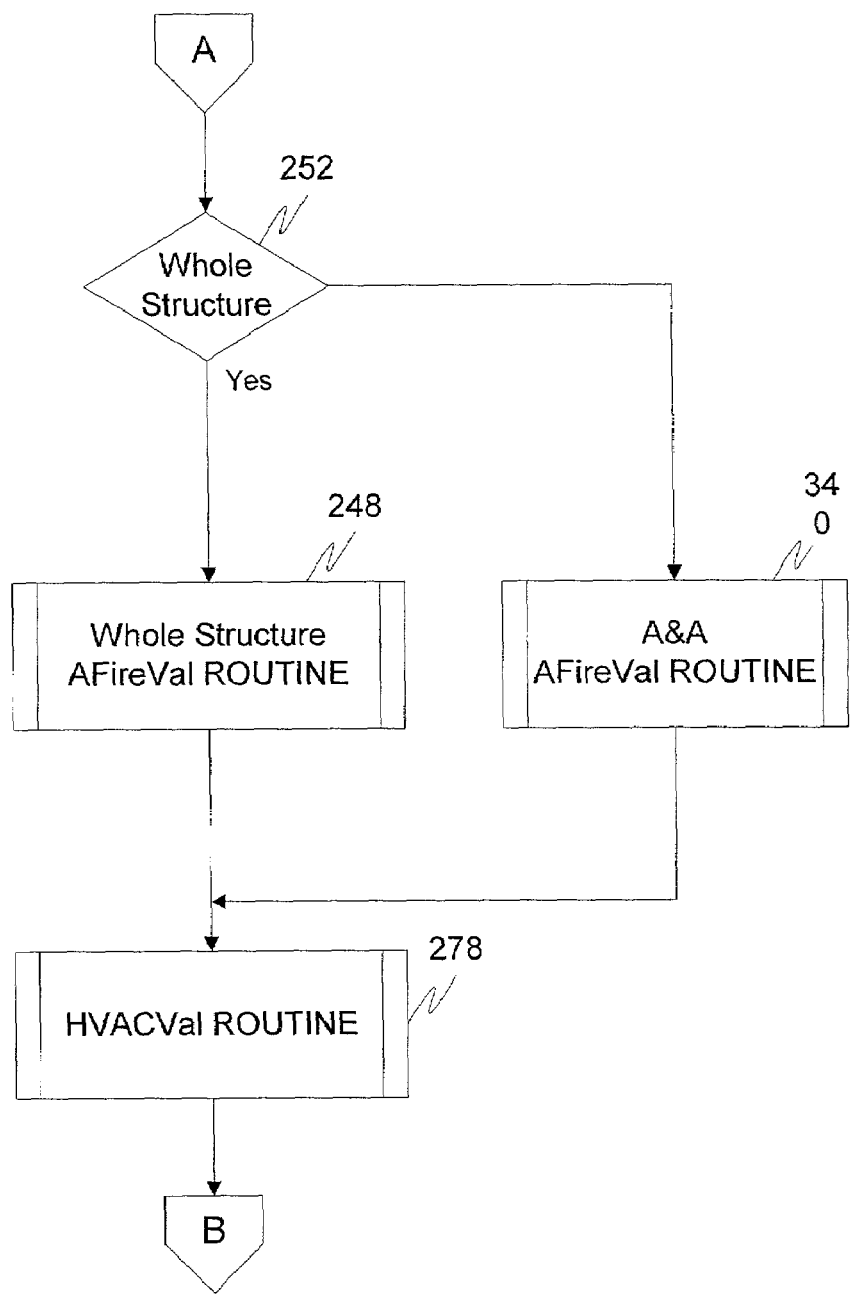
Figure 9C:
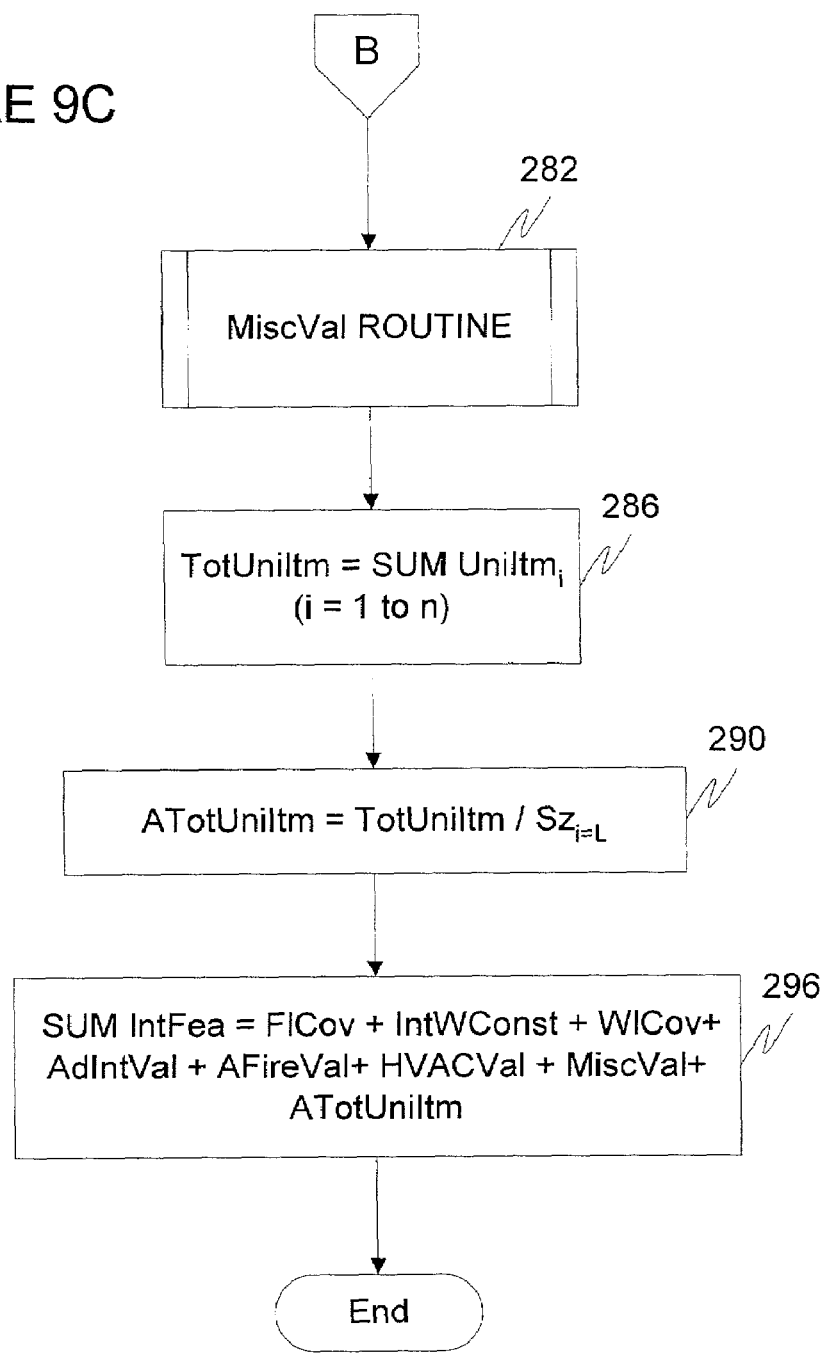

The sum of interior special features routine (SUM IntFea) is illustrated in detail in FIGS. 9A, 9B and 9C. For a full whole structure appraisal, in a step 214 the SUM IntFea routine obtains a value for floor coverings (FlCov) based on per-unit-area values of primary and secondary floor coverings (PriFlCov and SecFlCov). The values PriFlCov and SecFlCov are retrieved from a table of values in database 30 indexed according to type of floor covering, geographic region and quality of premises value (QP). The table is created in accordance with the special features methodology discussed above in connection with the exterior wall covering and roof covering special features. The values PriFlCov and SecFlCov are weighted by a factor "a" representing the proportion of the building having the primary floor covering. The value of "a" is determined as an average percentage extent of a building's floor covered by a primary floor covering and, thus, ranges from more than 50% up to 100%. Such average percentage extent is determined based on builder surveys, direct observation of typical buildings and Internet research. The weighted values PriFlCov and SecFlCov are then added to produce the floor covering value (FlCov).

In a step 218, a value for interior wall construction (IntWConst) is obtained based on construction types, such as double sheetrock, masonry and plaster and lath. Based on the value QP, the geographic region and the construction type, a value is obtained from a look-up table stored in the database 30 for the primary interior wall construction type (PriIWConst) and for the secondary interior wall construction type (SecIWConst). The table is created in accordance with the special features methodology described herein above. The value IntWConst is then obtained by adding the values PriIWConst and SecIWConst after they have been weighted by a value "b" representing the proportion of the interior walls having the primary interior wall construction type. The value of "b" is determined as an average percentage extent of a building's interior walls having a primary interior wall construction type and, thus, ranges from more than 50% up to 100%. Such average percentage extent is determined based on builder surveys, direct observations of typical buildings and Internet research.

In a step 222, a value (WlCov) is produced for the types of wall coverings present in the building pursuant to a WlCov routine illustrated in detail in FIG. 10. In a step 226 of FIG. 10, an intermediate value for the primary and secondary wall coverings is obtained, based on a value for a primary wall covering (PriWlCov) and a value for a secondary wall covering (SecWlCov). The values PriWlCov and SecWlCov are obtained from a table of values in database 30 indexed by type of wall covering, geographic region and quality of premises (QP). The table of values is created in accordance with the special features methodology described herein above. Once these values have been obtained, the value WlCov1 is produced by adding the values PriWlCov and SecWlCov after they have been weighted by a value "c" representing the proportion of the interior walls having the primary wall covering type. The value of "c" is determined as an average percentage extent of a building's interior walls having a primary wall covering and, thus, ranges from more than 50% up to 100%. Such average percentage extent is determined based on builder surveys, direct observations of typical buildings and Internet research.

In a step 230 an adjusted wall height value (AdjWlHt) is obtained by subtracting 8 feet from the average wall height of the interior walls (AvgWlHt), which is a value input by the user. In a step 234 the processor 22 produces a wall height adjustment value (WlHtAdj) by accessing a value corresponding to the quality of premises value (QP) from a table stored in the database 30. Once again, the table is created in accordance with the special features methodology described herein above. Then the processor 22 produces a wall height factor (WlHtFac) in a step 238 which is used to adjust the intermediate wall covering value (WlCov1) based on the average height of the interior walls over 8 feet. The wall height factor (WlHtFac) is produced by the processor 22 by dividing the adjusted wall height (AdjWlHt) by the wall height adjustment value (WlHtAdj), and then adding this ratio to 1, as indicated in step 238. Lastly, the wall covering value (WlCov) is produced in a step 240 by multiplying the intermediate wall covering value (WlCov1) by the wall height factor (WlHtFac).

Returning to FIG. 9A, in a step 244 the processor 22 accesses user inputs for the following interior feature types and values: window styles, kitchen cabinetry, kitchen countertops, kitchen backsplashes, number of full bathrooms, number of half bathrooms, bathroom floor type, bathroom countertops, bathroom vanities, bathroom plumbing fixtures, bathroom tubs and showers, wall trim, door types, door hardware, number of rooms with cabinetry, lighting and fireplace mantels. For each of these feature types and values, the processor 22 accesses a value from a corresponding table in the database 30 based on the quality of premises value (QP) and the geographic region. These tables are created in accordance with the special features methodology described herein above. These values are then totaled to produce a value AdintVal.

It is noted here that the procedure of FIGS. 9A, 9B and 9C is employed both in a full whole structure appraisal and in a full A&A appraisal, described herein below. In performing a full whole structure appraisal, the processor 22 branches from step 244 to a step 248 as indicated at 252 in FIG. 9B, to carry out a whole structure adjusted fireplace value (AFireVal) routine. The whole structure AFireVal routine is illustrated in FIG. 11.

Figure 11:
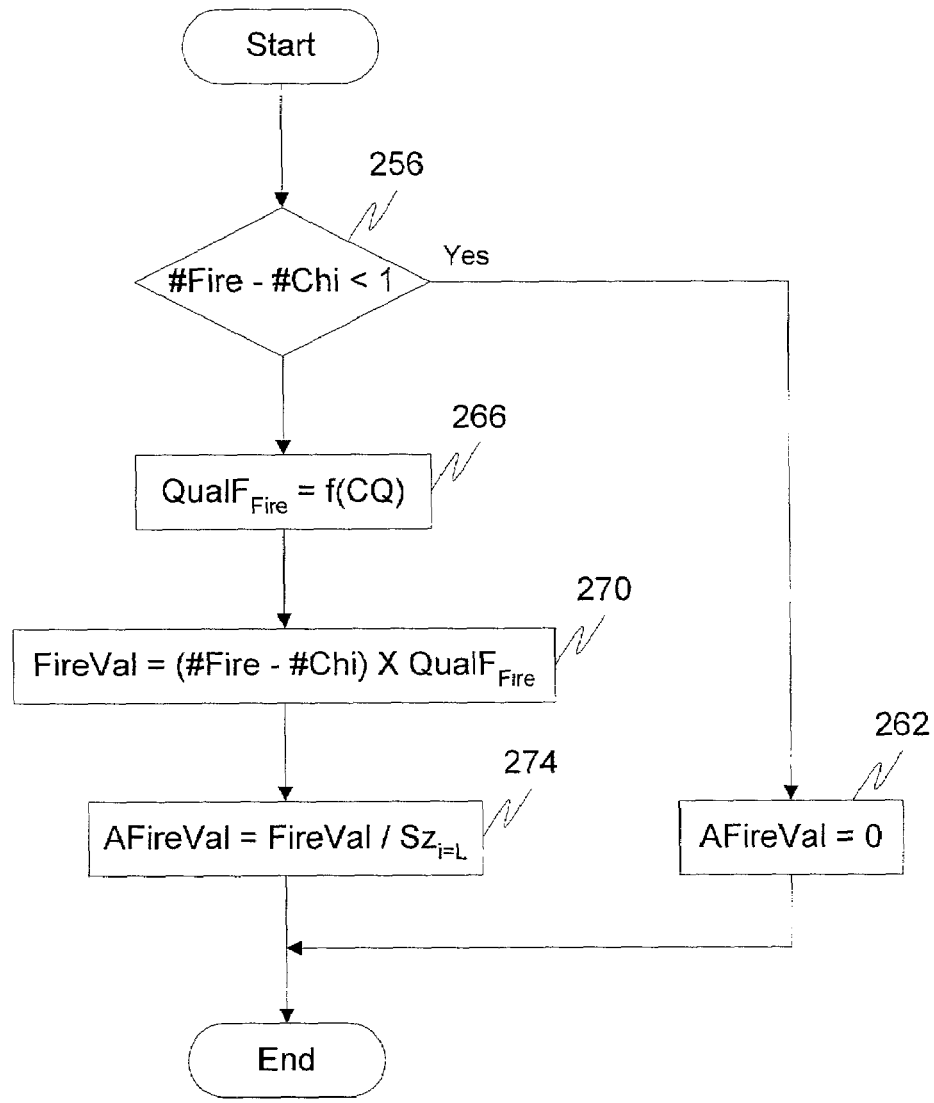
FIG. 11 is a flow diagram of an adjusted fireplace value routine within the routine of FIGS. 9A, 9B and 9C.

In step 256 of FIG. 11, the total number of chimneys in the building (#Chi) is subtracted from the total number of fireplaces therein (#Fire), and the result is examined to determine if it is less than 1. Since in a whole structure appraisal the cost of one fireplace is included in the already-determined value for each chimney as obtained in the routine of FIG. 8 described above, it is necessary to take this into account in the whole structure AFireVal routine. Accordingly, if (#Fire−#Chi) is less than 1, the value AFireVal is assigned a value of zero in a step 262.

If, however, the building includes more fireplaces than chimneys (for example, multiple fireplaces sharing a chimney), then the procedure continues in a step 266 to determine a quality factor for fireplaces $QualF_{Fire}$ obtained by the processor 22 from a respective look-up table in database 30 indexed to the construction quality value (CQ) and geographic region. This table is created in accordance with the special features methodology described herein above. Then a fireplace value FireVal is produced by multiplying the value (#Fire−#Chi) by $QualF_{Fire}$ in a step 270. Lastly, the processor 22 produces the value AFireVal in a step 274 by dividing the value FireVal by the size of the living area $SZ_{i=L}$ in order to derive a per-unit-area value for the building's fireplaces.

Referring again to FIG. 9B, in a step 278 an HVACVal routine is carried out in those cases where the user has indicated that the building is provided with a central air conditioning system. In this routine an HVAC value is obtained by the processor 22 from a look-up table in database 30 indexed according to the QP value and geographic region. The processor 22 also takes a user input for the number of zones (#Zones) and obtains a corresponding value (#ZVal) from a further look-up table in database 30. These tables are created in accordance with the special features methodology described herein above. Lastly, the processor 22 obtains a per-unit-area adjusted HVAC value (AHVACVal) by dividing the sum of the HVAC value and #ZVal by the size of the living area $Sz_{i=L}$.

In a step 282 of FIG. 9C the processor 22 takes a user input for miscellaneous items, which may include items such as bidets, ceiling fans, chandeliers, and so on. Values for such items are obtained from a look-up table in database 30 accessed therefrom by processor 22 based on the type of item, the geographic region and the quality of premises value (QP). The look-up table is created in accordance with the special features methodology described herein above. These values are totaled to produce a total of miscellaneous values (MiscVal).

Unique items present in the building are accounted for in steps 286 and 290. Such items could include, for example, a hand-painted mural valued at $25,000 and mosaic tiles in the building's foyer valued at $15,000. The values of all such unique items, each represented as $UnItm_i$, are summed to produce a value TotUniItm in step 286. Then the value TotUniItm is divided by the size of the living area $SZ_{i=L}$ in step 290 to produce an adjusted total value for unique items ATotUniItm.

At a last step 296 in the SUM IntFea routine, the value SUM IntFea is obtained by totaling the values FlCov (obtained in step 214), IntWConst (step 218), WlCov (step 222), AdIntVal (step 244), AFireVal (step 248), HVACVal (step 278), MiscVal (step 282) and ATotUniItm (step 290).

Upon completion of the SUM IntFea routine of FIGS. 9A, 9B and 9C, processing returns to the SUM SpF routine of FIGS. 7A and 7B at a step 300. Since a full appraisal is being conducted, there is no need to add a report adjustment value (RA) to account for omitted items, Accordingly, in step 300, the value RA is assigned a value of zero.

As noted above, the steps 182 and 186 of the SUM SpF routine are carried out in the same fashion for a full whole structure appraisal as for an exterior whole structure appraisal, except that the value SUM IntFea is likely to be non-zero in the full appraisal. Once SUM SpF has been determined in step 186 of FIG. 7B, processing returns to step 156 of FIG. 6 to obtain the value $AAV_{i=L}$ as the total of LAB, SUM SpF and RA (wherein RA=0). Thereupon, the process of determining the total reconstruction cost estimate for the building is completed in step 92 of FIG. 3B in the same manner as described above for the ballpark and exterior whole building appraisals.

As explained above, A&A reconstruction cost appraisals in accordance with the present invention are intended to appraise the reconstruction cost of buildings such as cooperative units and condominium properties, and thus an "exterior" appraisal is not conducted for such buildings. Set forth below are descriptions of certain embodiments of the present invention for appraising A&A reconstruction costs on a "ballpark" basis which does not take special features into account, as well as on a "full" basis which do take such special features into account.

In a ballpark A&A appraisal in accordance with certain embodiments of the present invention, which may be implemented in the system of FIG. 1A, the system of FIG. 1B or in another kind of system arrangement, the procedure is conducted in the same general manner as illustrated in FIGS. 3A and 3B. In addition a type factor routine useful in such embodiments has been described above in connection with FIG. 5.

Figure 12A:
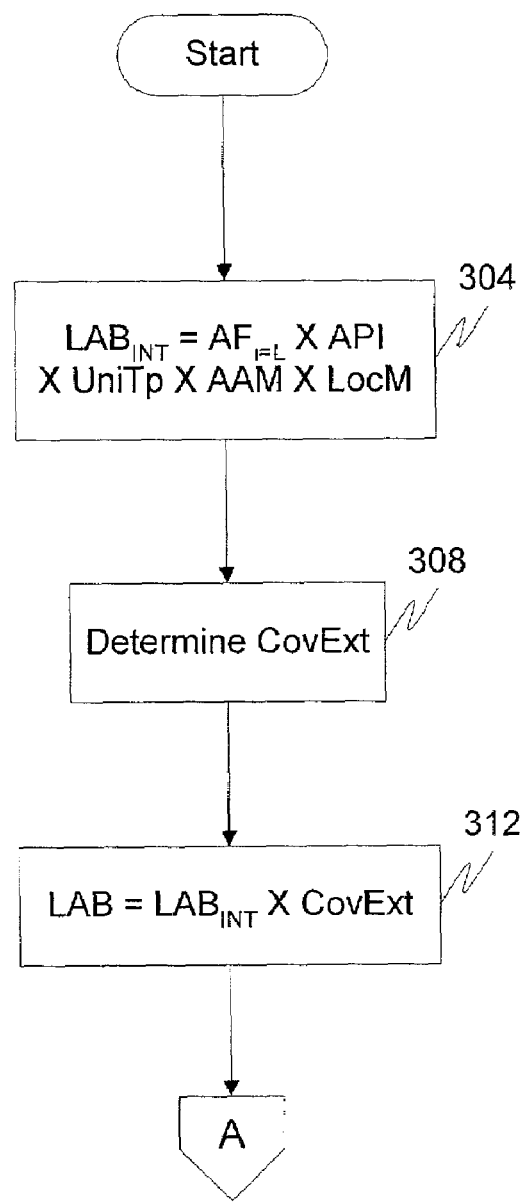
FIGS. 12A and 12B are a flow diagram of a total living area routine for an additions and alterations appraisal within the method of FIGS. 3A and 3B.

Further differences between the whole structure appraisals described above and the ballpark and full A&A appraisals will now be described in connection with a version of the Produce $AAV_{i=L}$ routine for an A&A appraisal illustrated in FIGS. 12A and 12B. In a step 304 of FIG. 12A, an intermediate living area base value ($LAB_{INT}$) is produced based on the user's inputs and data from the database 30. For this purpose the processor 22 accesses the area factor ($AF_{i=L}$) for the living area in that geographic location from the database 30, as well as the values of the adjusted price index (API) and the adjusted age multiplier (AAM), previously determined in the procedure described above in connection with FIG. 3A. In certain embodiments, the value API is estimated simply as one-half of the API for a corresponding whole structure appraisal. In certain other embodiments, API values both for whole structure appraisals and A&A appraisals are stored separately in database 30.

Also in step 304, a further value is obtained for the type of building unit (UniTp), based on a user input characterizing the building type and obtained from a table of type values stored in database 30. In certain embodiments of a residential appraisal method, such types include cooperative and condominium apartments, end unit, interior and stand-alone townhouses and brownstones. In addition, a location multiplier value (LocM) is produced to take account of reconstruction cost variations from one type of location to another. In certain embodiments of a residential appraisal method, these include a location in a condominium or townhouse community, a small city location, a medium-sized city location, a large city location and a resort location. The tables used for producing the type of building unit value and the location multiplier value, are created based on reconstruction cost data obtained from builder surveys and from independent appraisal firms. The aggregated reconstruction cost data are examined on scales of unit types and types of locations, to detect where on these scales significant pricing changes are apparent. These pricing change points are used to formulate various unit type and type of location categories and to assign appropriate values to each group reflecting their relative reconstruction cost differences for the tables of values UniTp and LocM. The intermediate living area base value ($LAB_{INT}$) is then obtained by multiplying the values $AF_{i=L}$, API, AAM, UniTp and LocM.

In a step 308, the ability to produce a coverage extent factor (CovExt) is afforded to assist in producing a reconstruction cost estimate for a reconstruction cost insurance policy with certain exceptions. For this purpose, the user is presented with a display of items for which coverage typically is optional and is prompted to select whether each item is covered by the policy (input "Yes") or is not covered (input "No"). A display of the type employed in certain embodiments of a residential reconstruction cost appraisal method is illustrated in Table 1 below. As will be seen with reference to Table 1, for each excluded item a predetermined reduction amount is subtracted from 1.00 in order to obtain the CovExt factor.

TABLE 1

| Reduction | Y/N | Coverage Extent | |
|---|---|---|---|
| 0 | Yes | appliances | −d |
| 0 | Yes | bathrooms | −e |
| 0 | Yes | lighting | −f |
| 0 | Yes | exterior doors | −g |
| 0 | Yes | exterior windows | −h |
| −j | No | fireplace mantels | −j |
| 0 | Yes | floor coverings | −k |
| 0 | Yes | heating and cooling | −l |
| 0 | Yes | interior partitions | −m |
| −n | No | kitchen cabs and counters | −n |
| 0 | Yes | wall coverings | −o |
| 1 − j − n | CovExt | | |

The values "d" to "h" and "j" to "o" are positive values between zero and 1.000 and are set equal to an average estimated proportion of the total reconstruction cost required to replace each respective item. These values are obtained by aggregating reconstruction cost data obtained by surveying builders, along with costs of materials and equipment obtained from suppliers.

Figure 12B:
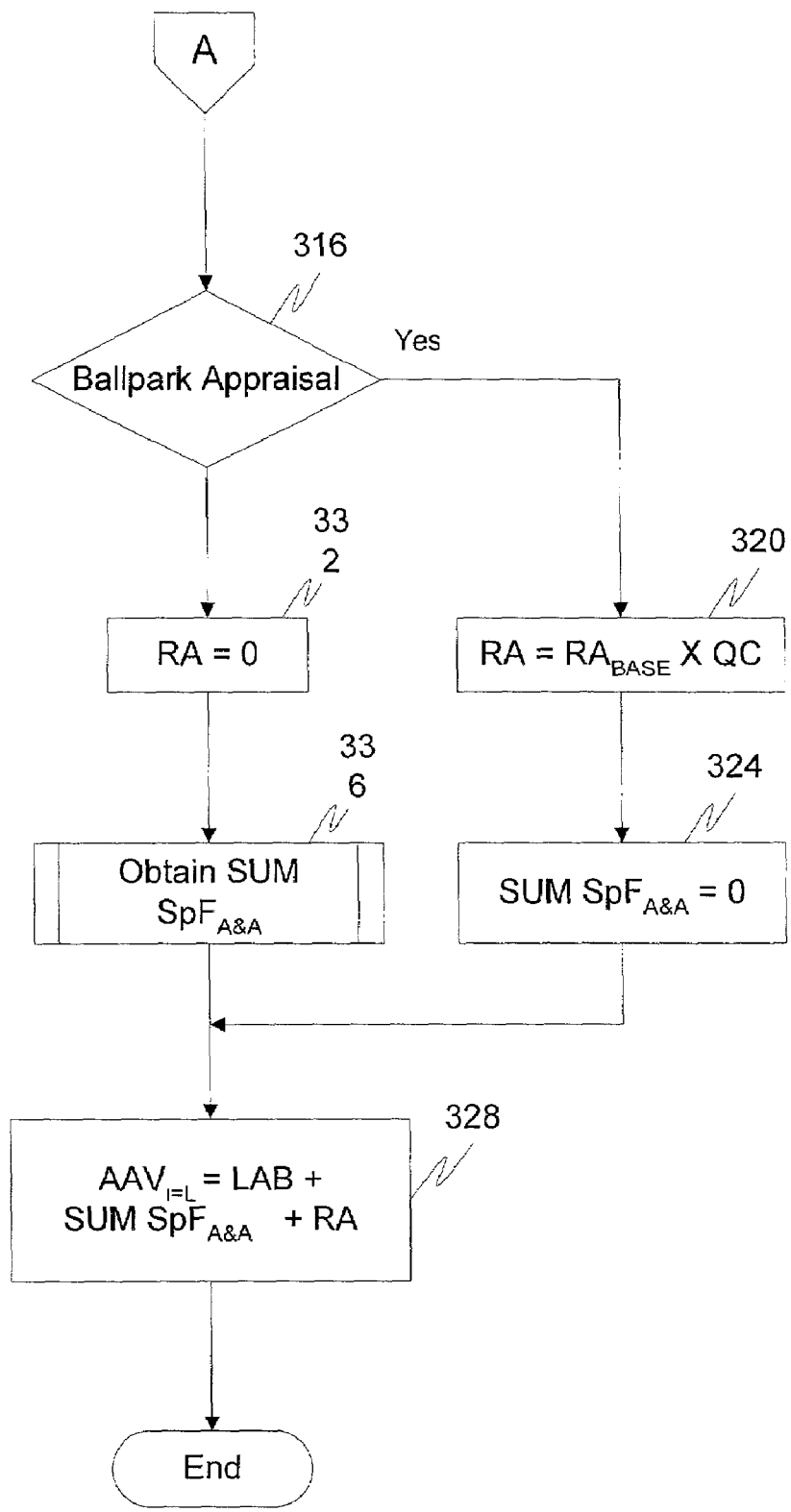

Once the CovExt factor has been determined in step 308, it is applied to adjust the intermediate living area base ($LAB_{INT}$) to account for the coverage exclusions. That is, in a step 312, the value $LAB_{INT}$ is multiplied by the factor CovExt to obtain a living area base value LAB.

Where an A&A ballpark appraisal is carried out, the procedure branches from the step 312 at step 316 to a step 320 in FIG. 12B. In the ballpark A&A appraisal a report adjustment value (RA) is added to the living area base value (LAB) to account for special features that are not separately considered. In certain embodiments, the report adjustment value (RA) is obtained in a step 320 by multiplying a fixed report adjustment value ($RA_{BASE}$) by an A&A quality of construction value (QC). $RA_{BASE}$ is produced based on the estimated total cost to reconstruct a typical building (as an interior unit) of average quality having the least expensive special features commonly found in such a building. The estimated cost to reconstruct such a building is obtained as discussed herein above in connection with the methodology for obtaining special features values. The average replacement costs for all such least expensive special features commonly found in such a typical building are summed. The ratio of the sum of such average replacement costs to the estimated total cost to reconstruct such typical buildings, is multiplied by the per-unit-area cost to reconstruct such typical building in order to obtain $RA_{BASE}$.

The processor 22 selects the value QC from a corresponding table maintained in database 30. In the A&A ballpark appraisal, the types, grades and characteristics of the special features included in the building being appraised are presumed based on the typical types, grades and characteristics of special features included in buildings having the same construction quality value (CQ) and in the same geographic region (CQ is determined according to the procedure of FIG. 5.). These typical special features for each quality classification indicated by the value CQ, are determined based on builder surveys. An adjustment ratio (QC) for each region and quality classification indicated by the value CQ, is produced by dividing (a) the sum of the average costs to replace the special features found in a typical building within such quality classification and region, to (b) the sum of the average costs to replace the special features found in a typical building within the average quality classification in such region. These QC values are stored in database 30 indexed by the region and construction quality value (CQ) for each respective quality classification. The processor 22 obtains the appropriate value for each appraisal based on the region and the value CQ determined in the procedure of FIG. 5.

Correspondingly, in the ballpark A&A appraisal of such embodiments, a sum of special features value (SUM $SPF_{A\&A}$) is assigned a value of zero in a step 324. Then the adjusted living area value ($AAV_{i=L}$) is produced in a step 328 as the total of the values LAB, SUM $SPF_{A\&A}$ (equal to zero in the ballpark appraisal) and RA.

Once the Produce $AAV_{i=L}$ routine has been completed, the appraisal procedure is completed in step 92 of FIG. 3B to produce the ballpark A&A total reconstruction cost appraisal value $RC_T$ by totaling the products of each adjusted area value ($AAV_i$) multiplied by the size of its respective area $Sz_i$.

In a full A&A appraisal in accordance with certain embodiments, the procedure corresponds to that for a ballpark A&A appraisal, except that in step 316 of FIG. 12B, it branches to a step 336 which assigns a value of zero to RA, since special features are individually included in the full appraisal. In a step 336, the sum of interior special features routine of FIGS. 9A, 9B and 9C is carried out. However, in place of the whole structure AFireVal routine 248, the procedure for a full A&A appraisal carries out a different A&A AFireVal routine in a step 340. In step 340, a fireplace value is obtained by the processor 22 from a table in the database 30 according to the construction quality for the building (CQ) and the geographic region. This fireplace value is then multiplied by the number of fireplaces present in the building and divided by the size of the living area, to obtain the value AFireVal. In all other respects the routine of FIGS. 9A, 9B and 9C is the same for a full A&A appraisal as for a full whole structure appraisal.

The present invention is readily adapted to conducting reconstruction cost appraisals for various additional types of structures, such as barns, boathouses, cabanas, caretaker's houses, club houses, docks, gazebos, grain silos, greenhouses, guard houses, children's playhouses, pool houses, equipment, tractor and general purpose sheds, spring houses, and storage houses. Such appraisals usually lend themselves to a simplified appraisal procedure. Such a procedure is illustrated in FIG. 13.

Figure 13:
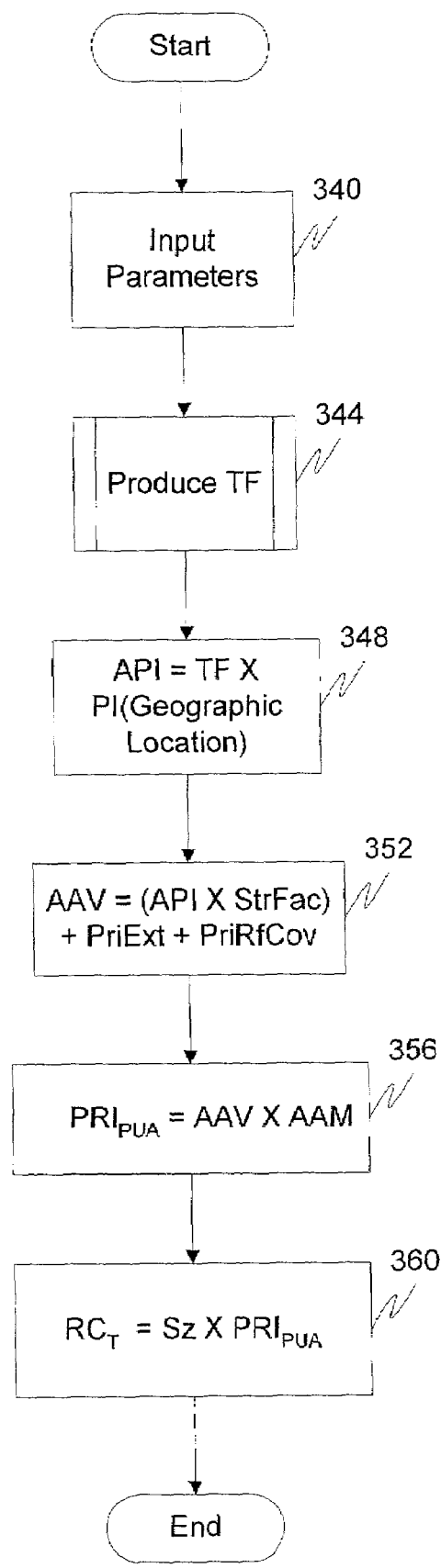
FIG. 13 is a flow diagram of an additional structures reconstruction cost estimating process.

In the procedure of FIG. 13, in a step 340 the user inputs the parameters required for carrying out the appraisal. In certain embodiments, the required data includes the geographic location of the building, the type of structure involved (for example, gazebo, equipment shed, etc.), the size of the building in area units, its age, its quality, its type of construction, its primary exterior type and primary roof covering.

In a step 344, a type factor is produced for the structure based on its quality, type of construction and geographic location. A construction-type factor is assigned based on classifications of similarly expensive construction types, determined based on builder surveys. For example, A-frame, log, modular wood frame and stick construction types are assigned to one classification, while brick veneer, steel framing and stone veneer types are assigned to a second and brick masonry and stone masonry types are assigned to a third. For each classification, the buildings are sub-classified according to quality, ranging from basic/economic to opulent/museum quality. Based on its classification and sub classification, the building being appraised is assigned a type factor obtained from the database 30 representing the ratio of the total replacement cost for such a building to that of a building falling within an average classification and sub-classification. The total replacement cost values are based on the aggregated results of total replacement cost estimates obtained from builder surveys, examined for break points when graded according to construction type and quality.

In a step 348, an adjusted price index is obtained for the building by multiplying price-index data obtained from the database 30 based on the building's geographic location with the assigned type factor. In a step 352, a primary exterior value (PriExt) and a primary roof covering value (PriRfCov) are obtained from the database 30 based on the quality of the building and its geographic location, from the same table as used in a whole structures appraisal as described herein above. Then the values PriExt and PriRfCov are added to the product of the adjusted price index and a structure factor obtained from the database 30 based on the type of the structure (for example, gazebo, greenhouse, spring house, etc.) in order to produce an adjusted area value. The structure factor is based on the average total replacement costs for each type of structure, obtained once again from builder surveys.

In a step 356, the adjusted area value is multiplied by an adjusted age multiplier obtained in the same manner as the adjusted age multiplier described in connection with FIG. 3A above, to produce a price per unit area ($PRI_{PUA}$). Lastly, in a step 360, the value $PRI_{PUA}$ is multiplied by the size of the building in area units (Sz) to produce an estimated total reconstruction cost for the building.

In certain embodiments of each of the whole structure, A&A and additional structure types appraisals, overall reconstruction cost data, as well as labor and materials cost values are adjusted from time to time based on price index data from governmental sources, such as the United States Departments of Labor and Commerce, Bureau of Labor and Statistics and Bureau of Economic Analysis.

Although the invention has been described with reference to certain advantageous embodiments, arrangements of elements or steps, features and the like, these are not intended to exhaust or exclude all or any possible embodiments, arrangements or features, and indeed other modifications and variations will be ascertainable to those of skill in the art.

What is claimed is:

1. A method for estimating a reconstruction cost for a designated area within a building, comprising: providing access to a database of reconstruction-pricing data comprising: (a) a plurality of price-index data indexed by corresponding geographic location and representing reconstruction-pricing data for a plurality of different building types and a plurality of different building-area types within a building, (b) comparative building-category data representing relative pricing levels for reconstructing each of a plurality of different building categories, and (c) comparative building-area data representing relative pricing levels for reconstructing each of the plurality of different building-area types within a building; providing geographic-location data of a predetermined building; providing building category-defining data for the predetermined building; providing building area-type data for a designated area within the building, the building area-type data being selected from the plurality of different building-area types within a building; obtaining relevant price-index data from the database for the geographic location of the predetermined building based on the geographic-location data; obtaining relevant comparative building-category data from the database for the predetermined building based on the building category-defining data for the predetermined building; obtaining relevant comparative building-area data from the database based on the building area-type data for the designated area; producing a reconstruction-cost estimate for the designated area within the building based on the relevant price-index data, the relevant comparative building-category data and the relevant comparative building-area data; and communicating the reconstruction-cost estimate to at least one of a presentation device and a user system for presentation to a user.

2. The method of claim 1, wherein the comparative building-category data comprises a plurality of comparative building-category data indexed by geographic location, and comprising obtaining the relevant building-category data from the database based on the geographic-location data.

3. The method of claim 1, wherein the comparative building-area data comprises a plurality of comparative building-area data indexed by geographic location, and comprising obtaining the relevant comparative building-area data from the database based on the geographic-location data.

4. A system for estimating a reconstruction cost for a designated area within a building, comprising: means for providing access to a database of reconstruction-pricing data comprising: (a) a plurality of price-index data indexed by corresponding geographic location and representing reconstruction-pricing data for a plurality of different building types and a plurality of different building-area types within a building, (b) comparative building-category data representing relative pricing levels for reconstructing each of a plurality of different building categories, and (c) comparative building-area data representing relative pricing levels for reconstructing each of the plurality of different building-area types within a building; means for providing geographic-location data of a predetermined building; means for providing building category-defining data for the predetermined building; means for providing building area-type data for a designated area within the building, the building area-type data being selected from the plurality of different building-area types within a building; means for obtaining relevant price-index data from the database for the geographic location of the predetermined building based on the geographic-location data; means for obtaining relevant comparative building-category data from the database for the predetermined building based on the building category-defining data for the predetermined building; means for obtaining relevant comparative building-area data from the database based on the building area-type data for the designated area; and means for producing a reconstruction-cost estimate for the designated area within the building based on the relevant price-index data, the relevant comparative building-category data and the relevant comparative building-area data.

5. A method for estimating a reconstruction cost for a predetermined building, comprising: providing access to a database of reconstruction cost data accessible by geographic location and type of area within a building; providing geoaraphic-location data indicating a geographic location of the predetermined building; providing first building area-type data indicating a type of a first area within the building and second building area-type data indicating a type of a second area within the building, the first and second building area-type data being selected from a plurality of different predetermined building-area types; obtaining first reconstruction-cost data for the first area within the building from the database, the first reconstruction-cost data corresponding to the geographic-location data and the first building area-type data; obtaining second reconstruction-cost data for the second area within the building from the database, the second reconstruction-cost data corresponding to the geographic-location data and the second building area-type data; producing a reconstruction-cost estimate for the building based on the first and second reconstruction-cost data; and communicating the reconstruction-cost estimate to at least one of a presentation device and a user system for presentation to a user.

6. A system for estimating a reconstruction cost for a predetermined building, comprising: means for providing access to a database of reconstruction-cost data accessible by geographic location and type of area within a building; means for providing geographic-location data indicating a geographic location of the predetermined building; means for providing first building area-type data indicating a type of a first area within the building and second building area-type data indicating a type of a second area within the building, the first and second building area-type data being selected from a plurality of different predetermined building-area types; means for obtaining first reconstruction-cost data for the first area within the building from the database; the first reconstruction-cost data corresponding to the geographic-location data and the first building area-type data; means for obtaining second reconstruction-cost data for the second area within the building from the database, the second reconstruction-cost data corresponding to the geographic-location data and the second building area-type data; and means for producing a reconstruction-cost estimate for the building based on the first and second reconstruction-cost data.

7. A method for estimating a reconstruction cost for a predetermined area within a building, comprising:
   providing access to a database of full reconstruction-pricing data based on builder-supplied full reconstruction-price data, the full reconstruction-pricing data being expressed as a plurality of per unit area pricing data accessible according to geographic location and/or type of building area selected from a predetermined plurality of building-area types within a building;
   providing geographic-location data indicating a geographic location of a predetermined building;
   providing building area-type data for a designated area within the building, the building area-type data being selected from the predetermined plurality of building-area types;
   obtaining corresponding per-unit-area pricing data for the designated area from the database, the corresponding per-unit-area pricing data corresponding to the geographic-location data and the building area-type data;
   producing a reconstruction-cost estimate for the designated area based on the corresponding per-unit-area pricing data and a size value for the designated area; and
   communicating the reconstruction-cost estimate to at least one of a presentation device and a user system for presentation to a user.

8. A system for estimating a reconstruction cost for a predetermined area within a building, comprising:
   means for providing access to a database of full reconstruction-pricing data based on builder-supplied full reconstruction-price data, the full reconstruction-pricing data being expressed as a plurality of per-unit-area pricing data accessible according to geographic location and/or type of building area selected from a predetermined plurality of building-area types within a building;
   means for providing geographic-location data indicating a geographic location of a predetermined building;
   means for providing building area-type data for a designated area within the building, the building area-type data being selected from the predetermined plurality of building-area types;
   means for obtaining corresponding per-unit-area pricing data for the designated area from the database, the corresponding per-unit-area pricing data corresponding to the geographic-location data and the building area-type data; and
   means for producing a reconstruction-cost estimate for the designated area based on the corresponding per-unit-area pricing data and a size value for the designated area.

* * * * *